United States Patent
Zhu et al.

(10) Patent No.: US 11,705,952 B2
(45) Date of Patent: Jul. 18, 2023

(54) PERIODIC CHANNEL STATE INFORMATION REFERENCE SIGNAL BEAM MANAGEMENT SCHEDULING

(71) Applicant: QUALCOMM Incorporated, San Diego, CA (US)

(72) Inventors: Jun Zhu, San Diego, CA (US); Ruhua He, San Diego, CA (US); Yong Li, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/332,517

(22) Filed: May 27, 2021

(65) Prior Publication Data

US 2021/0376907 A1 Dec. 2, 2021

Related U.S. Application Data

(60) Provisional application No. 63/032,887, filed on Jun. 1, 2020.

(51) Int. Cl.
*H04B 7/02* (2018.01)
*H04B 7/06* (2006.01)

(52) U.S. Cl.
CPC ......... *H04B 7/0695* (2013.01); *H04B 7/0626* (2013.01)

(58) Field of Classification Search
CPC .......................... H04B 7/0695; H04B 7/0626
(Continued)

(56) References Cited

U.S. PATENT DOCUMENTS 10,349,330 B2 * 7/2019 Guerreiro ........... H04W 36/245
10,841,914 B2 * 11/2020 Liou ..................... H04L 5/0094
(Continued)

OTHER PUBLICATIONS

Intel Corporation: "Cell Reselection and Measurements", 3GPP Draft; R2-1700344, 3rd Generation Partnership Project (3GPP), Mobile Competence Centre ; 650. Route Des Lucioles ; F-06921 Sophia-Antipolis Cedex; France, vol. RAN WG2. No. Spokane, USA; Jan. 17, 2017-Jan. 19, 2017, Jan. 17, 2017 (Jan. 17, 2017), XP051210923, 4 Pages, Retrieved from the Internet: URL:http://www.3gpp.org/ftp/Meetings_3GPP_SYNC/RAN2/Docs/ [retrieved on Jan. 17, 2017].
(Continued)

*Primary Examiner* — Helene E Tayong
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may measure, using one or more receive beams, a channel state information reference signal (CSI-RS) transmitted on a transmit beam of the CSI-RS according to a beam management configuration for periodic CSI-RSs, where the UE performs measurements according to a static beam sweeping schedule or a dynamic beam sweeping schedule associated with the transmit beam of the CSI-RS based at least in part on the beam management configuration. In some aspects, the UE may transmit a measurement report indicating one or more measurements of the CSI-RS based at least in part on measuring the CSI-RS. Numerous other aspects are provided.

30 Claims, 9 Drawing Sheets

(58) Field of Classification Search
USPC .......................................................... 375/267
See application file for complete search history.

(56) References Cited

U.S. PATENT DOCUMENTS

| | | | |
|---|---|---|---|
| 10,993,132 B2 | 4/2021 | Zhu et al. | |
| 11,128,419 B2* | 9/2021 | Yoon | H04L 5/0023 |
| 11,159,217 B2* | 10/2021 | Zhang | H04B 7/0695 |
| 2009/0189812 A1 | 7/2009 | Xia et al. | |
| 2014/0198681 A1 | 7/2014 | Jung et al. | |
| 2015/0304868 A1 | 10/2015 | Yu et al. | |
| 2017/0237477 A1 | 8/2017 | Fujio et al. | |
| 2017/0303173 A1 | 10/2017 | Cedergren et al. | |
| 2017/0331577 A1 | 11/2017 | Parkvall et al. | |
| 2018/0048375 A1 | 2/2018 | Guo et al. | |
| 2019/0150013 A1* | 5/2019 | Zhang | H04B 7/082 375/224 |
| 2019/0181932 A1* | 6/2019 | Jayawardene | H04B 7/0617 |
| 2019/0349915 A1* | 11/2019 | Ahn | H04L 5/0091 |
| 2019/0380099 A1* | 12/2019 | Hakola | H04B 7/088 |
| 2020/0068549 A1* | 2/2020 | Kang | H04W 16/28 |
| 2020/0196161 A1* | 6/2020 | Ahn | H04W 56/001 |
| 2020/0228189 A1* | 7/2020 | Tang | H04W 36/36 |
| 2021/0084640 A1* | 3/2021 | Kang | H04B 7/00 |
| 2021/0321280 A1 | 10/2021 | Zhu et al. | |

OTHER PUBLICATIONS

International Preliminary Report on Patentability—PCT/US2019/013512, The International Bureau of WIPO—Geneva, Switzerland, dated Aug. 6, 2020.

International Search Report and Written Opinion—PCT/US2019/013512—ISA/EPO—dated Jun. 6, 2019.

Qualcomm Incorporated: "NB-PSS and NB-SSS Design", 3GPP TSG RAN WG1 NB-IoT, 3GPP Draft R1-160105 NB-PSS and NB-SSS Design, 3rd Generation Partnership Project (3GPP), Mobile Competence Centre; 650, Route Des Lucioles; F-06921 Sophia-Antipolis Cedex; France, vol. RAN WG1, No. Budapest, HU; Jan. 18, 2016-Jan. 20, 2016, Jan. 17, 2016 (Jan. 17, 2016), pp. 1-11, XP051053425, Retrieved from the Internet: URL: http://www.3gpp.org/ftp/Meetings_3GPP_SYNC/RAN1/Docs/ [retrieved on Jan. 17, 2016], paragraph [0002]; figure 1.

Samsung: "NR Signals for Downlink Beam Management", 3GPP Draft; R2-1713796 NR Signals for Downlink Beam Management, 3rd Generation Partnership Project (3GPP), Mobile Competence Centre ; 650, Route Des Lucioles ; F-06921 Sophia-Antipolis Cedex; France, vol. RAN WG2, No. Reno. USA; Nov. 27, 2017-Nov. 29, 2017, Nov. 17, 2017 (Nov. 17, 2017),XP051372451, 6 Pages, Retrieved from the Internet: URL:http://www.3gpp.org/ftp/tsg%5Fran/WG2%5FRL2/TSGR2%5F100/Docs/ [retrieved on Nov. 17, 2017].

ZTE., et al., "Discussion on Beam Recovery Mechanism", 3GPP TSG RAN WG1 Meeting #88bis, 3GPP Draft ; R1-1704400 Discussion on Beam Recovery Mechanism, 3rd Generation Partnership Project (3GPP), Mobile Competence Centre; 650, Route Des Lucioles; F-06921 Sophia-Antipolis Cedex; France, vol. RAN WG1, No. Spokane, USA; Apr. 3, 2017-Apr. 7, 2017, Apr. 2, 2017 (Apr. 2, 2017), XP051242548, 6 Pages, Retrieved from the Internet: URL: http://www.3gpp.org/ftp/Meetings_3GPP_SYNC/RAN1/Docs/ [retrieved on Apr. 2, 2017].

\* cited by examiner

PERIODIC CHANNEL STATE INFORMATION REFERENCE SIGNAL BEAM MANAGEMENT SCHEDULING

CROSS-REFERENCE TO RELATED APPLICATION

This Patent Application claims priority to U.S. Provisional Patent Application No. 63/032,887, filed on Jun. 1, 2020, entitled "PERIODIC CHANNEL STATE INFORMATION REFERENCE SIGNAL BEAM MANAGEMENT SCHEDULING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for periodic channel state information (CSI) reference signal (CSI-RS) beam management scheduling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include measuring, using one or more receive beams, a channel state information reference signal (CSI-RS), transmitted on a transmit beam of the CSI-RS, according to a beam management configuration for periodic CSI-RSs, wherein the UE performs measurements according to a static beam sweeping schedule or a dynamic beam sweeping schedule associated with the transmit beam of the CSI-RS based at least in part on the beam management configuration; and transmitting a measurement report indicating one or more measurements of the CSI-RS based at least in part on measuring the CSI-RS.

In some aspects, a non-transitory computer-readable medium may store one or more instructions for wireless communication. The one or more instructions, when executed by one or more processors of a UE, may cause the one or more processors to measure, using one or more receive beams, a CSI-RS, transmitted on a transmit beam of the CSI-RS, according to a beam management configuration for periodic CSI-RSs, wherein the UE performs measurements according to a static beam sweeping schedule or a dynamic beam sweeping schedule associated with the transmit beam of the CSI-RS based at least in part on the beam management configuration; and transmit a measurement report indicating one or more measurements of the CSI-RS based at least in part on measuring the CSI-RS.

In some aspects, a UE for wireless communication may include a memory and one or more processors coupled to the memory. The memory and the one or more processors may be configured to measure, using one or more receive beams, a CSI-RS, transmitted on a transmit beam of the CSI-RS, according to a beam management configuration for periodic CSI-RSs, wherein the UE performs measurements according to a static beam sweeping schedule or a dynamic beam sweeping schedule associated with the transmit beam of the CSI-RS based at least in part on the beam management configuration; and transmit a measurement report indicating one or more measurements of the CSI-RS based at least in part on measuring the CSI-RS.

In some aspects, an apparatus for wireless communication may include means for measuring, using one or more receive beams, a CSI-RS, transmitted on a transmit beam of the CSI-RS, according to a beam management configuration for periodic CSI-RSs, wherein the UE performs measurements according to a static beam sweeping schedule or a dynamic beam sweeping schedule associated with the transmit beam of the CSI-RS based at least in part on the beam management configuration; and means for transmitting a measurement report indicating one or more measurements of the CSI-RS based at least in part on measuring the CSI-RS.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
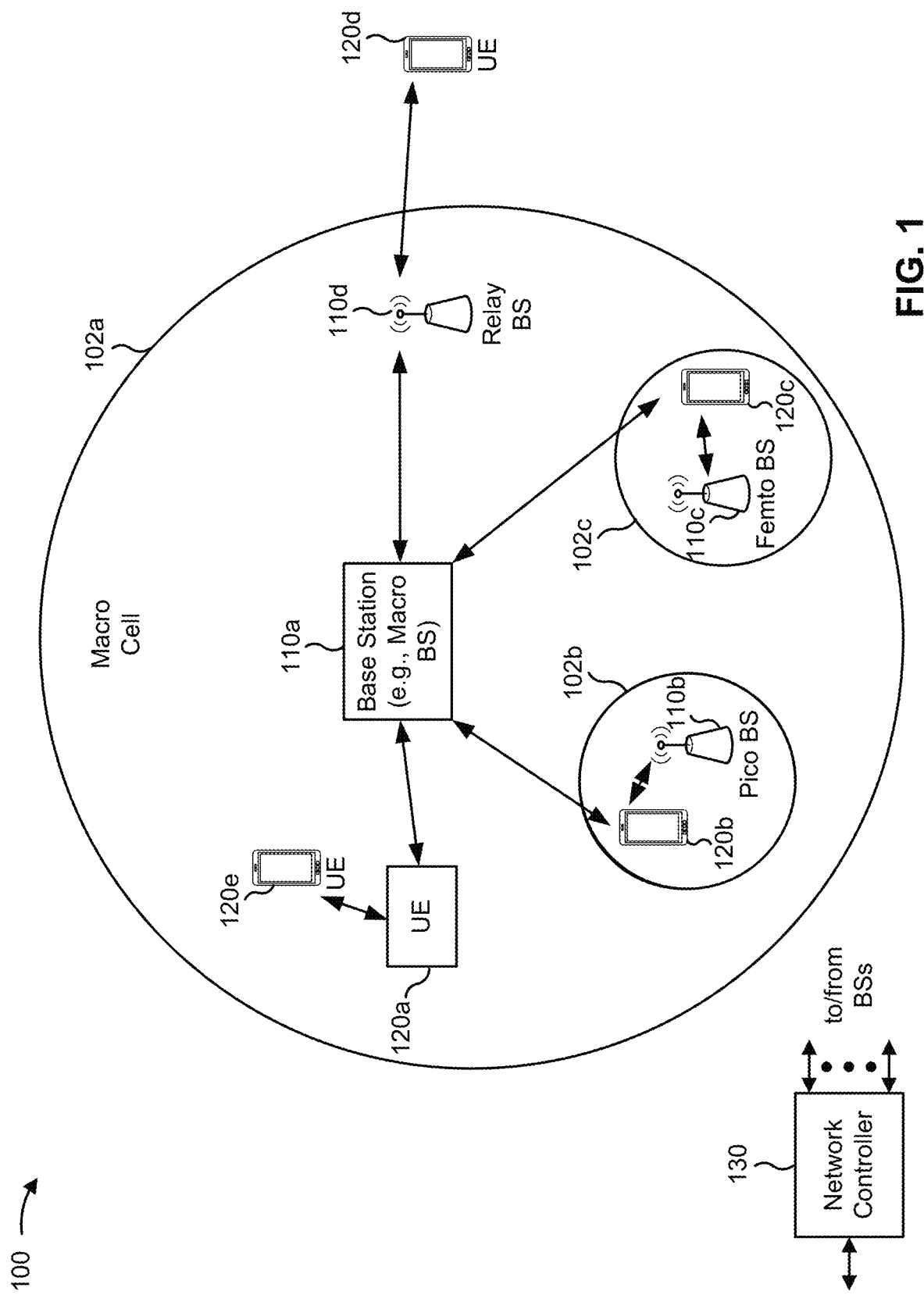
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6

GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
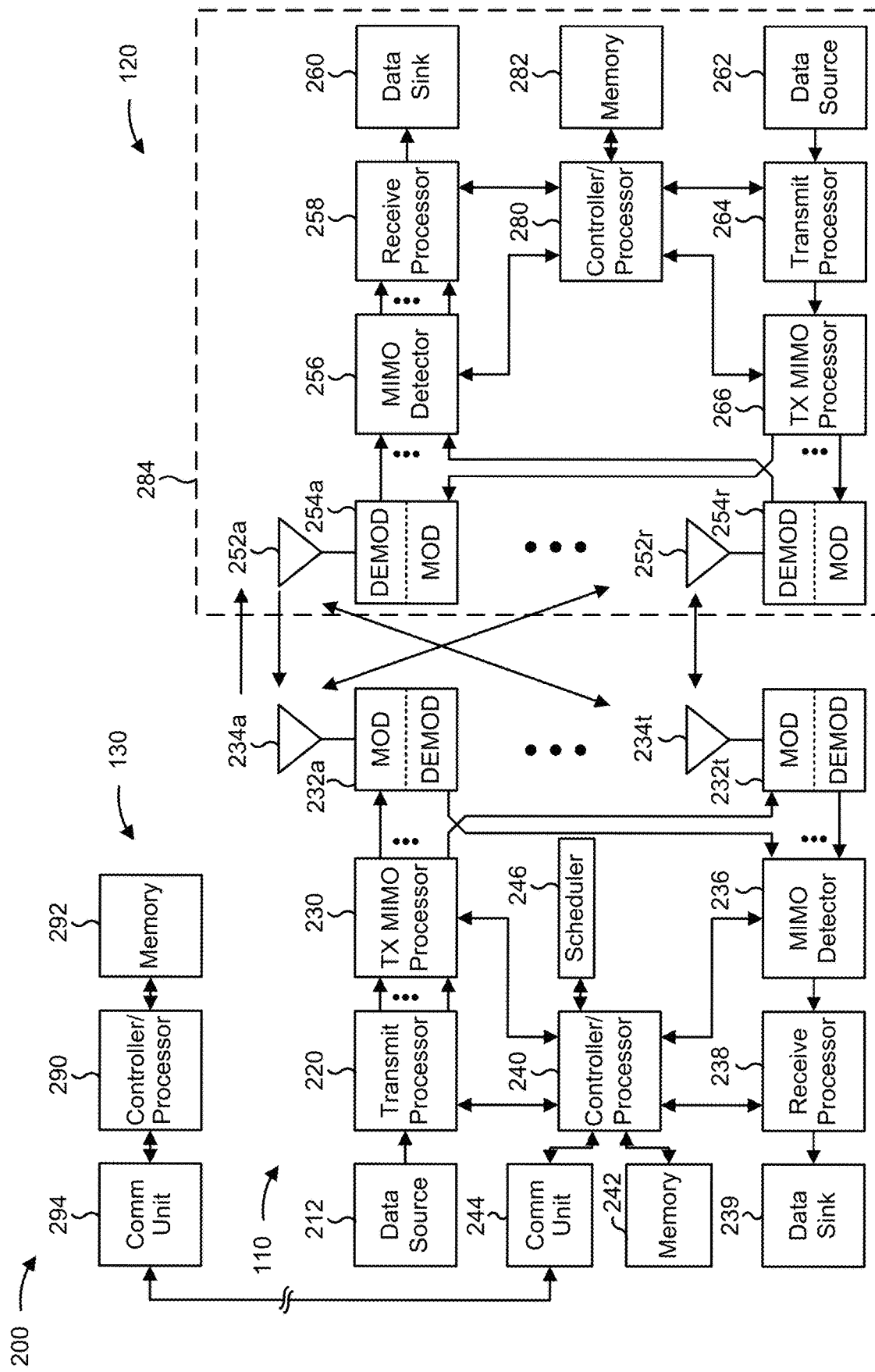
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6A, 6B, 7, and/or 8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6A, 6B, 7, and/or 8).

Controller/processor 240 of base station 110, controller/processor 280 of UE 120, and/or any other component(s) of FIG. 2 may perform one or more techniques associated with periodic channel state information reference signal (CSI-RS) beam management scheduling, as described in more detail elsewhere herein. For example, controller/processor 240 of base station 110, controller/processor 280 of UE 120, and/or any other component(s) of FIG. 2 may perform or direct operations of, for example, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, and/or other processes as described herein. In some aspects, executing instructions may include running the instructions, converting the instructions, compiling the instructions, and/or interpreting the instructions, among other examples.

In some aspects, UE 120 may include means for measuring, using one or more receive beams, a CSI-RS, transmitted on a transmit beam of the CSI-RS, according to a beam management configuration for periodic CSI-RSs, wherein the UE performs measurements according to a static beam sweeping schedule or a dynamic beam sweeping schedule associated with the transmit beam of the CSI-RS based at least in part on the beam management configuration (e.g., using antenna 252, DEMOD 254, MIMO detector 256, receive processor 258, controller/processor 280, memory 282, and/or the like); and/or means for transmitting a measurement report indicating one or more measurements of the CSI-RS based at least in part on measuring the CSI-RS (e.g., using controller/processor 280, transmit processor 264, TX MIMO processor 266, MOD 254, antenna 252, and/or memory 282), among other examples. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
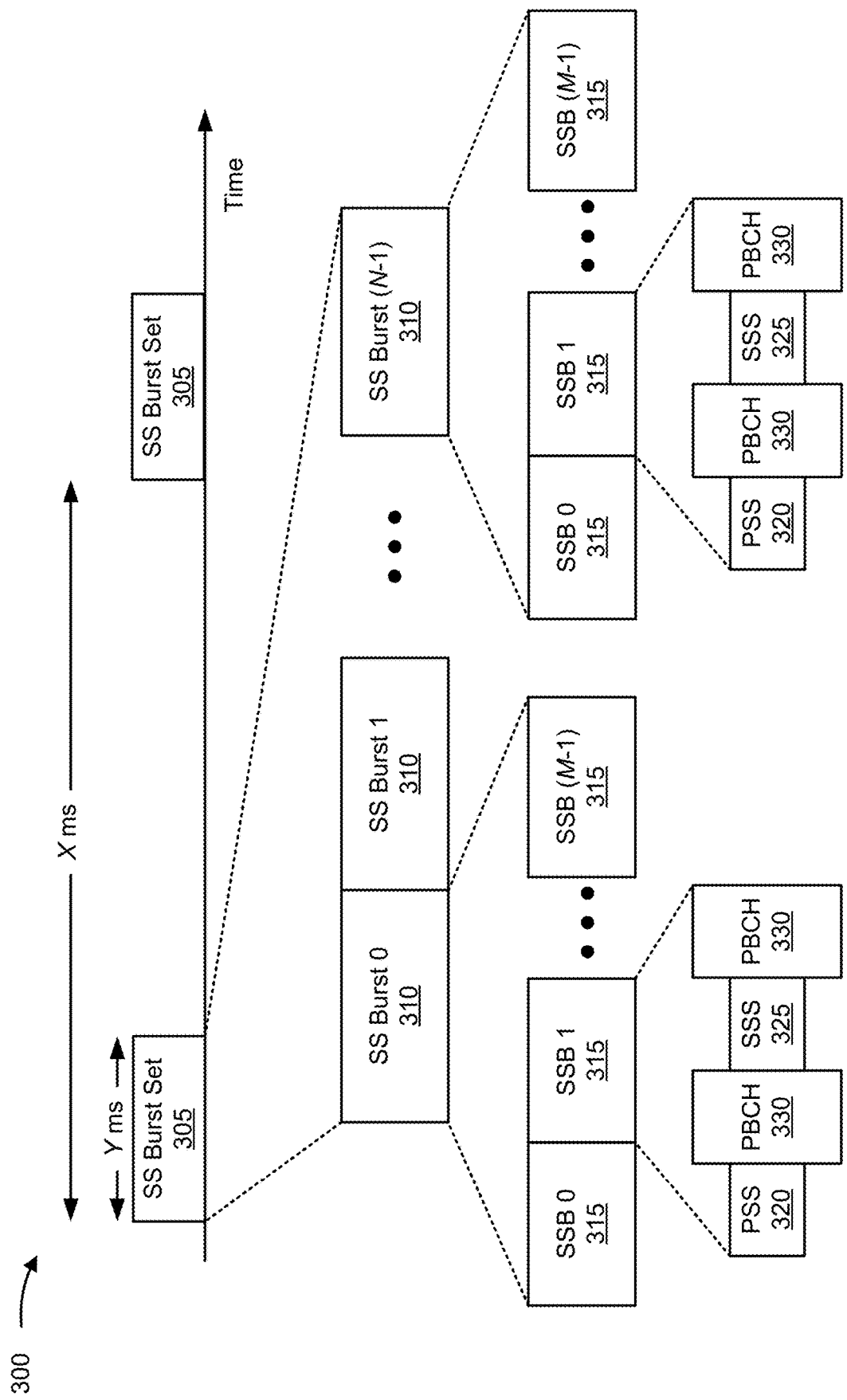
FIG. 3 is a diagram illustrating an example of a synchronization signal (SS) hierarchy, in accordance with the present disclosure.

FIG. 3 is a diagram illustrating an example 300 of a synchronization signal (SS) hierarchy, in accordance with the present disclosure. As shown in FIG. 3, the SS hierarchy may include an SS burst set 305, which may include multiple SS bursts 310, shown as SS burst 0 through SS burst N-1, where N is a maximum number of repetitions of the SS burst 310 that may be transmitted by the base station. As further shown, each SS burst 310 may include one or more SS blocks (SSBs) 315, shown as SSB 0 through SSB M-1, where M is a maximum number of SSBs 315 that can be carried by an SS burst 310. In some aspects, different SSBs 315 may be beam-formed differently (e.g., transmitted using different beams), and may be used for beam management, beam selection, and/or the like (e.g., as part of an initial network access procedure). An SS burst set 305 may be periodically transmitted by a wireless node (e.g., base station 110), such as every X milliseconds, as shown in FIG. 3. In some aspects, an SS burst set 305 may have a fixed or dynamic length, shown as Y milliseconds in FIG. 3. In some cases, an SS burst set 305 or an SS burst 310 may be referred to as a discovery reference signal (DRS) transmission window, an SSB measurement time configuration (SMTC) window, and/or the like.

In some aspects, an SSB 315 may include resources that carry a primary synchronization signal (PSS) 320, a secondary synchronization signal (SSS) 325, a physical broadcast channel (PBCH) 330, and/or the like. In some aspects, multiple SSBs 315 are included in an SS burst 310 (e.g., with transmission on different beams), and the PSS 320, the SSS 325, and/or the PBCH 330 may be the same across each SSB 315 of the SS burst 310. In some aspects, a single SSB 315 may be included in an SS burst 310. In some aspects, the SSB 315 may be at least four symbols (e.g., OFDM symbols) in length, where each symbol carries one or more of the PSS 320 (e.g., occupying one symbol), the SSS 325 (e.g., occupying one symbol), and/or the PBCH 330 (e.g., occupying two symbols). In some aspects, an SSB 315 may be referred to as an SS/PBCH block.

In some aspects, the symbols of an SSB 315 are consecutive, as shown in FIG. 3. In some aspects, the symbols of an SSB 315 are non-consecutive. Similarly, in some aspects, one or more SSBs 315 of the SS burst 310 may be transmitted in consecutive radio resources (e.g., consecutive symbols) during one or more slots. Additionally, or alternatively, one or more SSBs 315 of the SS burst 310 may be transmitted in non-consecutive radio resources.

In some aspects, the SS bursts 310 may have a burst period, and SSBs 315 of an SS burst 310 may be transmitted by a wireless node (e.g., base station 110) according to the burst period. In this case, the SSBs 315 may be repeated during each SS burst 310. In some aspects, the SS burst set 305 may have a burst set periodicity, whereby the SS bursts 310 of the SS burst set 305 are transmitted by the wireless node according to the fixed burst set periodicity. In other words, the SS bursts 310 may be repeated during each SS burst set 305.

In some aspects, an SSB 315 may include an SSB index, which may correspond to a beam used to carry the SSB 315. A UE 120 may monitor for and/or measure SSBs 315 using different receive (Rx) beams during an initial network access procedure. Based at least in part on the monitoring and/or measuring, the UE 120 may indicate one or more SSBs 315 with a best signal parameter (e.g., an RSRP parameter and/or the like) to a base station 110. The base station 110 and the UE 120 may use the one or more indicated SSBs 315 to select one or more beams to be used for communication between the base station 110 and the UE 120 (e.g., for a random access channel (RACH) procedure and/or the like). Additionally, or alternatively, the UE 120 may use the SSB 315 and/or the SSB index to determine a cell timing for a cell via which the SSB 315 is received (e.g., a serving cell).

As indicated above, FIG. 3 is provided as an example. Other examples may differ from what is described with regard to FIG. 3.

Figure 4:
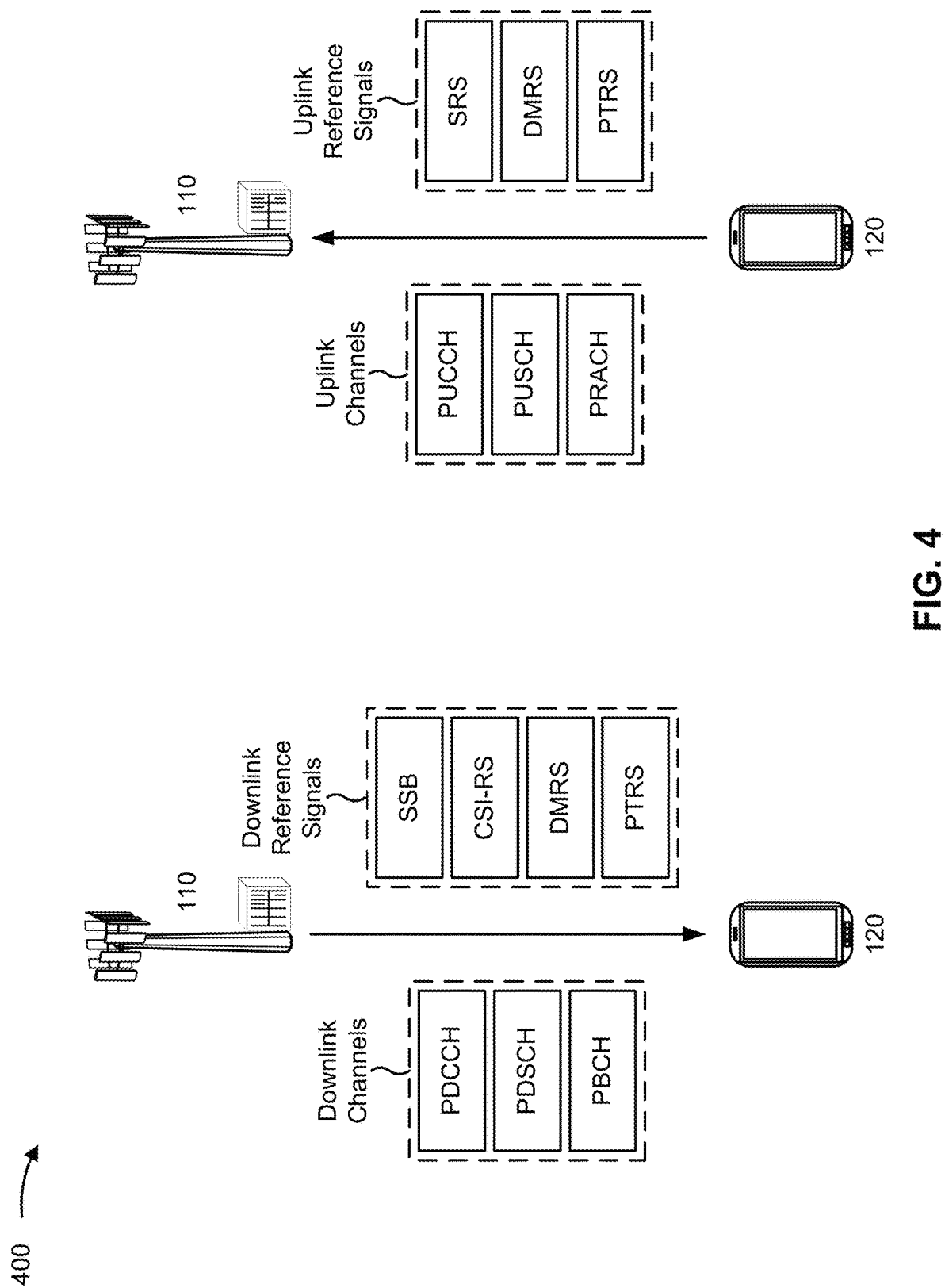
FIG. 4 is a diagram illustrating an example of physical channels and reference signals in a wireless network, in accordance with the present disclosure.

FIG. 4 is a diagram illustrating an example 400 of physical channels and reference signals in a wireless network, in accordance with the present disclosure. As shown in FIG. 4, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include an SSB, a CSI-RS, a demodulation reference signal (DMRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a channel quality indicator (CQI), a precoding matrix indicator (PMI), a CSI-RS resource indicator (CRI), a layer indicator (LI), a rank indicator (RI), or an RSRP, among other examples. The base station 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, a PTRS can be utilized at high carrier frequencies, such as millimeter wave frequencies, to mitigate phase noise. The PTRS may be used to track the phase of the local oscillator and to enable suppression of phase noise and common phase error. As shown, PTRSs are used for both downlink communications (e.g., on the PDSCH) and uplink communications (e.g., on the PUSCH).

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 4 is provided as an example. Other examples may differ from what is described with regard to FIG. 4.

Figure 5:
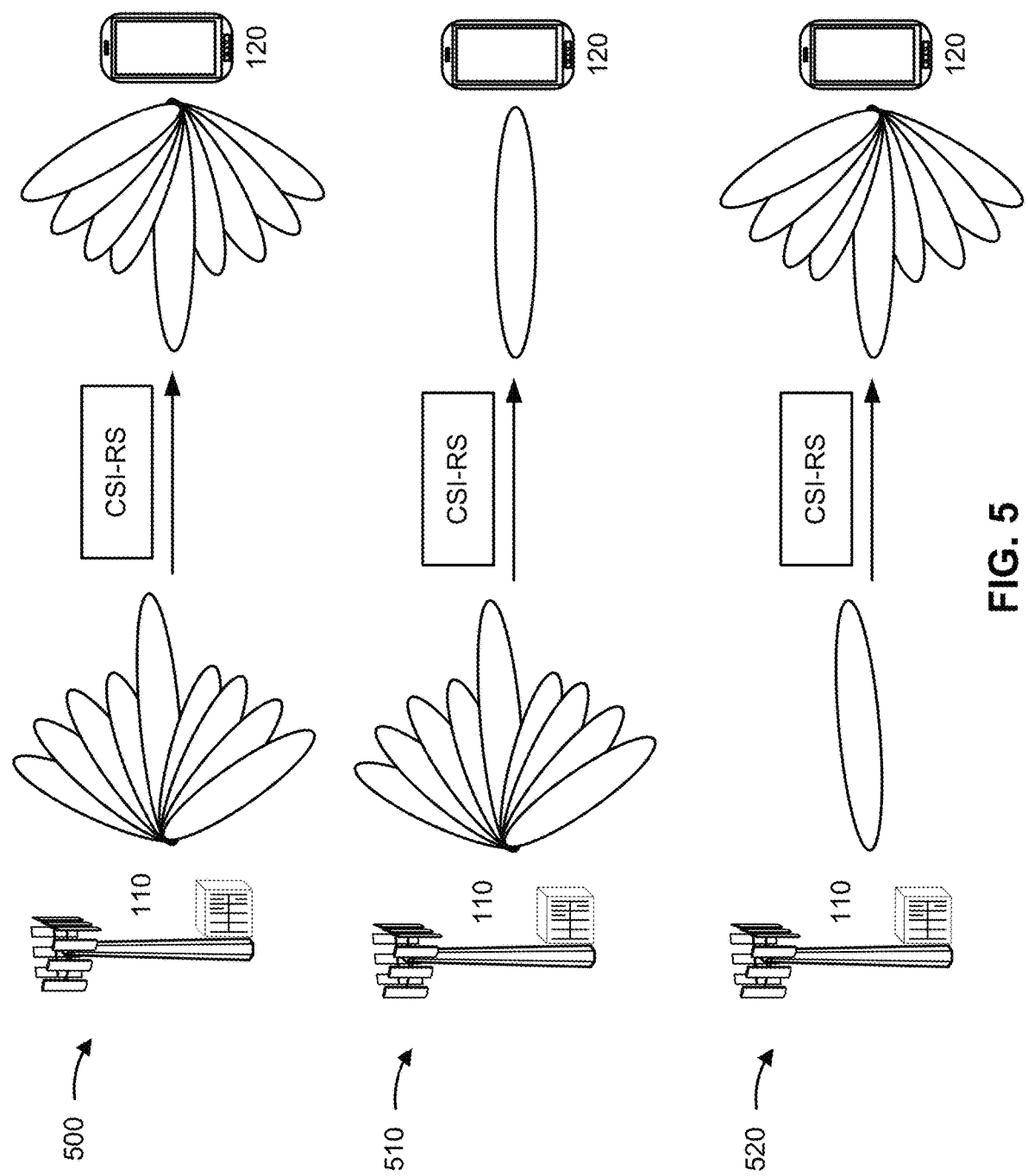
FIG. 5 is a diagram illustrating one or more examples of channel state information reference signal (CSI-RS) beam management procedures, in accordance with the present disclosure.

FIG. 5 is a diagram illustrating one or more examples 500, 510 and 520 of CSI-RS beam management procedures, in accordance with the present disclosure. As shown in FIG. 5, examples 500, 510, and 520 include a UE 120 in communication with a base station 110 in a wireless network (e.g., wireless network 100). However, it will be appreciated that the devices shown in FIG. 5 are exemplary only, and that the wireless network may support communication and beam management between other devices (e.g., between a UE 120 and a base station 110 or transmit receive point (TRP), between a mobile termination node and a control node, between an integrated access and backhaul (IAB) child node and an IAB parent node, between a scheduled node and a scheduling node, and/or the like). In some aspects, the UE 120 and the base station 110 may be in a connected state (e.g., a radio resource control (RRC) connected state).

As shown in FIG. 5, example 500 may include a base station 110 and a UE 120 communicating to perform beam management using CSI-RSs. Example 500 depicts a first beam management procedure (e.g., P1 CSI-RS beam management). The first beam management procedure may be referred to as a beam selection procedure, an initial beam acquisition procedure, a beam sweeping procedure, a cell search procedure, a beam search procedure, and/or the like. As shown in FIG. 5 and example 500, CSI-RSs may be configured to be transmitted from the base station 110 to the UE 120. The CSI-RSs may be configured to be periodic (e.g., using RRC signaling), semi-persistent (e.g., using media access control (MAC) control element (MAC-CE) signaling), and/or aperiodic (e.g., using DCI).

The first beam management procedure may include the base station 110 performing beam sweeping over multiple transmit (Tx) beams. The base station 110 may transmit a CSI-RS using each transmit beam for beam management. To enable the UE 120 to perform receive (Rx) beam sweeping, each CSI-RS on a transmit beam can be transmitted repeatedly multiple times in the same reference signal (RS)

resource set so that the UE 120 can sweep through receive beams in multiple transmission instants. For example, if the base station 110 has a set of N transmit beams and the UE 120 has a set of M receive beams, the CSI-RS may be transmitted on each of the N transmit beams M times so that the UE 120 may receive M beams per transmit beam. In other words, for each transmit beam of the base station 110, the UE 120 may perform beam sweeping through the receive beams of the UE 120. As a result, the first beam management procedure may enable the UE 120 to measure a CSI-RS on different transmit beams using different receive beams to support selection of base station 110 transmit beams/UE 120 receive beam(s) beam pair(s). The UE 120 may report the measurements to the base station 110 to enable the base station 110 to select one or more beam pair(s) for communication between the base station 110 and the UE 120. While example 500 has been described in connection with CSI-RSs, the first beam management process may also use SSBs for beam management in a similar manner as described above.

As shown in FIG. 5, example 510 may include a base station 110 and a UE 120 communicating to perform beam management using CSI-RSs. Example 510 depicts a second beam management procedure (e.g., P2 CSI-RS beam management). The second beam management procedure may be referred to as a beam refinement procedure, a base station beam refinement procedure, a TRP beam refinement procedure, a transmit beam refinement procedure, and/or the like. As shown in FIG. 5 and example 510, CSI-RSs may be configured to be transmitted from the base station 110 to the UE 120. The CSI-RSs may be configured to be aperiodic (e.g., using DCI and/or the like). The second beam management procedure may include the base station 110 performing beam sweeping over one or more transmit beams. The one or more transmit beams may be a subset of all transmit beams associated with the base station 110 (e.g., determined based at least in part on measurements reported by the UE 120 in connection with the first beam management procedure). The base station 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the in connection with the first beam management procedure). The second beam management procedure may enable the base station 110 to select a best transmit beam based at least in part on reported measurements received from the UE 120 (e.g., using the single receive beam).

As shown in FIG. 5, example 520 may depict a third beam management procedure (e.g., P3 CSI-RS beam management). The third beam management procedure may be referred to as a beam refinement procedure, a UE beam refinement procedure, a receive beam refinement procedure, and/or the like. As shown in FIG. 5 and example 520, one or more CSI-RSs may be configured to be transmitted from the base station 110 to the UE 120. The CSI-RSs may be configured to be aperiodic (e.g., using DCI). The third beam management process may include the base station 110 transmitting the one or more CSI-RSs on a single transmit beam (e.g., determined based at least in part on measurements reported by the UE 120 in connection with the first beam management procedure and/or the second beam management procedure). To enable the UE 120 to perform receive beam sweeping, the CSI-RS on the transmit beam can be transmitted repeatedly multiple times in the same RS resource set so that UE 120 can sweep through one or more receive beams in multiple transmission instants. The one or more receive beams may be a subset of all receive beams associated with the UE 120 (e.g., determined based at least in part on measurements performed in connection with the first beam management procedure and/or the second beam management procedure). The third beam management procedure may enable the base station 110 and/or the UE 120 to select a best receive beam based at least in part on reported measurements received from the UE 120 (e.g., of the CSI-RS on the transmit beam using the one or more receive beams).

In some cases, such as when a periodic CSI-RS is configured for beam management, a base station and a UE may sweep through all transmit beams (e.g., of the base station) and all receive beams (e.g., of the UE) during a beam selection procedure (e.g., the first beam management procedure described above). For example, the base station may transmit reference signals (e.g., CSI-RSs and/or SSBs) on each transmit beam associated with the base station. For each transmit beam, the UE may measure the reference signal on each receive beam associated with the UE and report the measurements to the base station to enable selection of one or more beam pairs. However, as the base station may be associated with a high quantity of transmit beams (e.g., 128 transmit beams or similar amounts of transmit beams), this procedure may require significant overhead. Moreover, performing full beam sweeps of both the base station transmit beams and the UE receive beams for each CSI-RS may be inefficient for identifying and selecting candidate beam pair(s).

Some techniques and apparatuses described herein enable periodic CSI-RS beam management scheduling for a UE. For example, a periodic CSI-RS may be transmitted on a quantity of transmit beams from a base station (e.g., based at least in part on a transmit beam sweep performed by the base station). The UE may be enabled to configure each transmit beam of the CSI-RS with different beam sweeping schedules for beam sweeps of the receive beams of the UE. For example, in some aspects, the UE may perform beam sweeping according to a static schedule where the UE performs beam sweeping across all (or a set of) receive beams for a transmit beam. In some cases, the UE may perform beam sweeping according to a dynamic schedule where the UE performs beam sweeping across prioritized beams (e.g., rather than all beams). As a result, receive beams with high historical measurement values and/or located spatially near other beams with high historical measurement values (e.g., prioritized beams) may be measured and scheduled more often. This may result in a more efficient beam management procedure. Moreover, this may reduce latency associated with identifying and selecting beam pair(s), as the UE may measure the CSI-RS on a transmit beam using prioritized receive beams more often, enabling the base station to select a best beam pair quicker.

As indicated above, FIG. 5 is provided as an example. Other examples may differ from what is described with respect to FIG. 5.

Figure 6A:
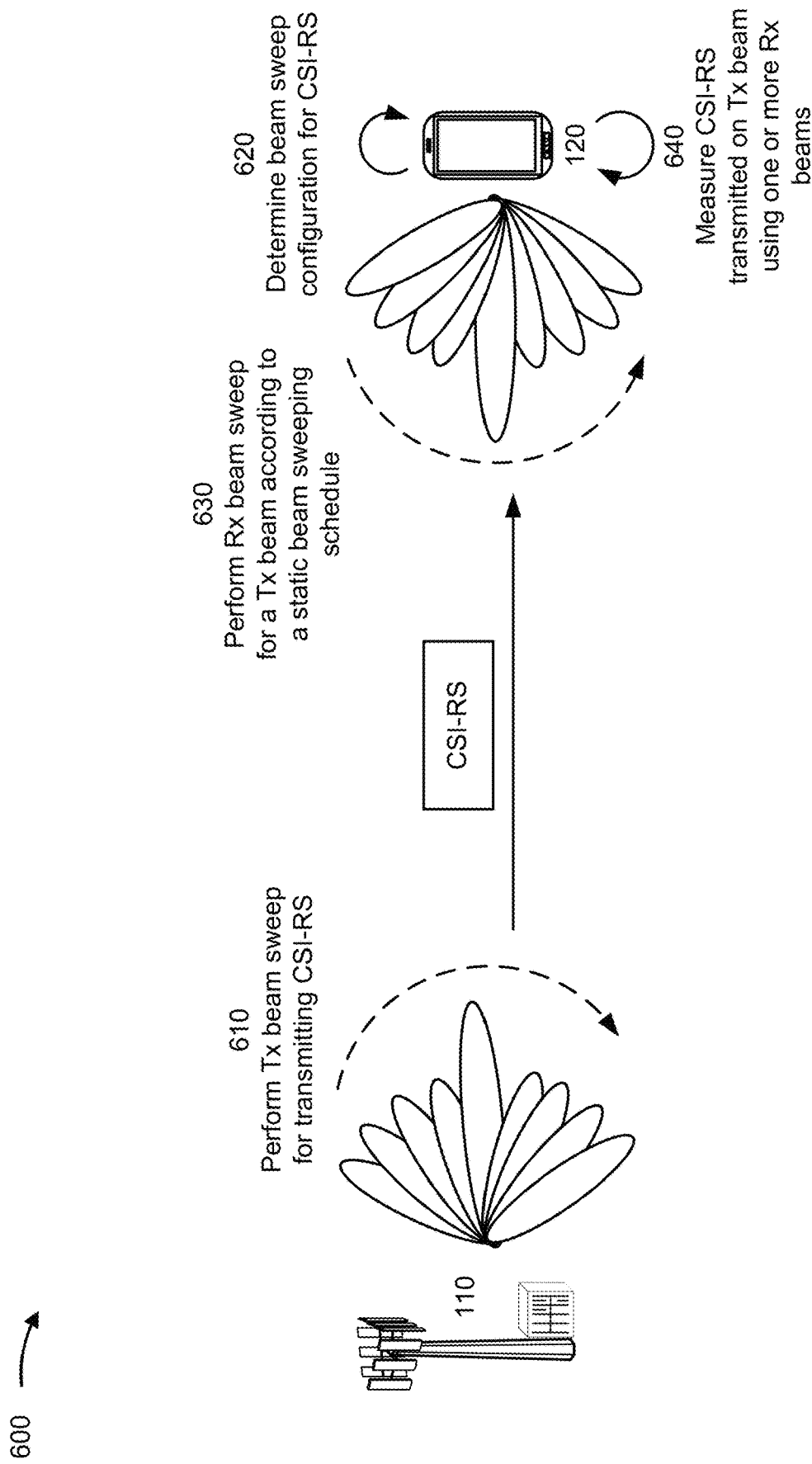
FIGS. 6A and 6B are diagrams illustrating one or more examples associated with periodic CSI-RS beam management scheduling, in accordance with the present disclosure.
Figure 6B:
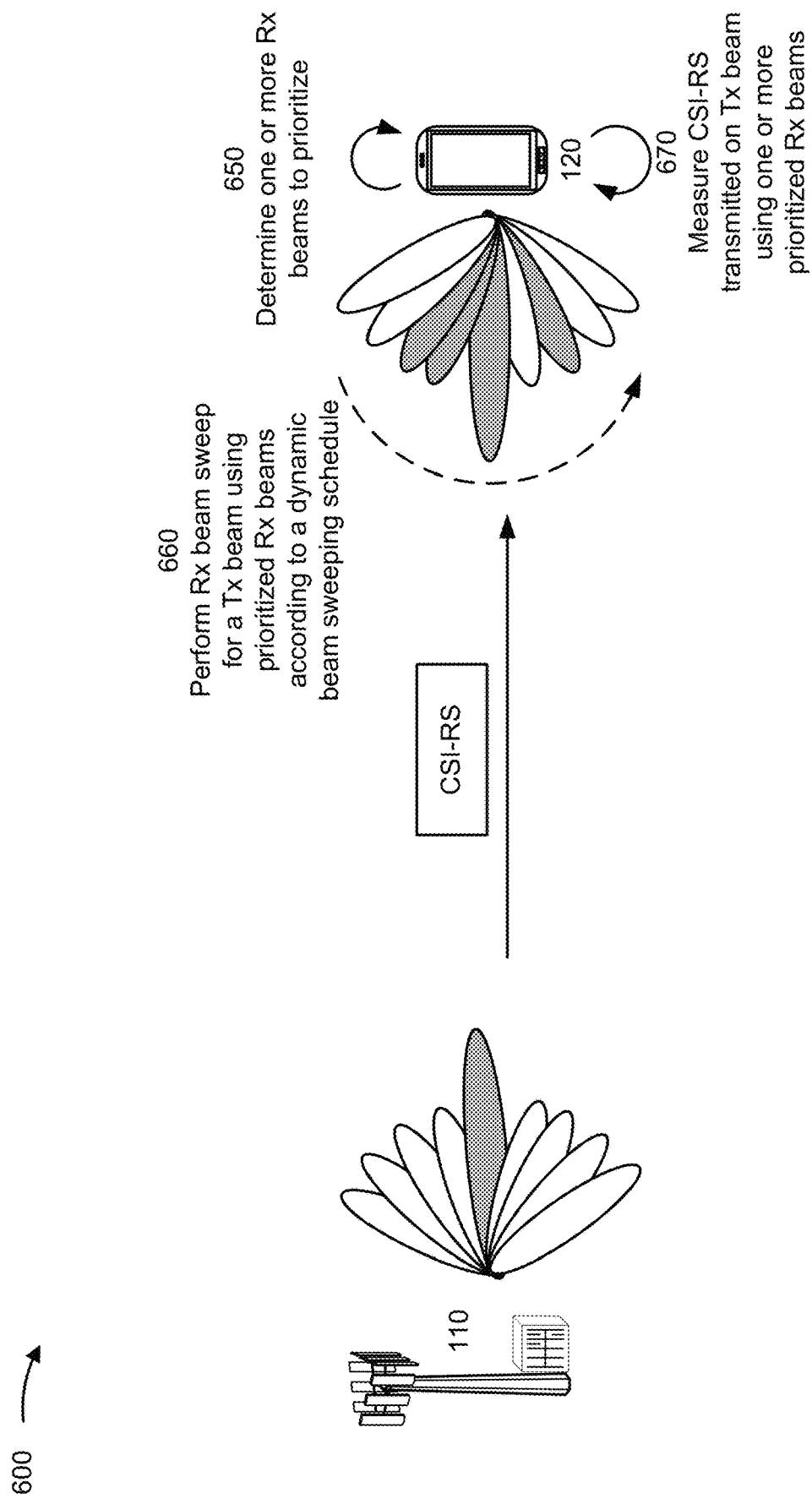

FIGS. 6A and 6B are diagrams illustrating one or more example(s) 600 of periodic CSI-RS beam management scheduling, in accordance with the present disclosure. As shown in FIGS. 6A and 6B, a base station 110 and a UE 120 may communicate with one another in a wireless network (e.g., wireless network 100).

The base station 110 may configure periodic CSI-RS for beam management. In some aspects, the beam management may be a first beam management procedure discussed above in connection with FIG. 5 and example 500 (e.g., the P1 beam management procedure). For example, as shown in FIG. 6A, and by reference number 610, the base station may transmit a CSI-RS of the periodic CSI-RSs to the UE 120. The base station 110 may perform a transmit beam sweep across all transmit beams associated with the base station 110. In some aspects, the base station 110 may transmit the CSI-RS on each transmit beam associated with the base station 110. In some aspects, the base station 110 may repeat the CSI-RS on a transmit beam M times, where M corresponds to a quantity of receive beams associated with the UE 120. In some aspects, the base station 110 may repeat the CSI-RS on a transmit beam more or less times than M times.

As shown by reference number 620, the UE 120 may determine a beam management configuration (e.g., a beam sweep configuration, a beam sweeping schedule, and/or a measurement schedule) for the CSI-RS. In some aspects, the configuration may indicate a static beam sweeping schedule or a dynamic beam sweeping schedule associated with each transmit beam of the CSI-RS. For example, a first transmit beam of the CSI-RS may be associated with a static beam sweeping schedule (e.g., where the UE 120 measures the CSI-RS on the transmit beam by performing beam sweeping of receive beams according to the static beam sweeping schedule). A second transmit beam of the CSI-RS may be associated with a dynamic beam sweeping schedule (e.g., where the UE 120 measures the CSI-RS on the transmit beam by performing beam sweeping of receive beams according to the dynamic beam sweeping schedule). In other words, the UE 120 may autonomously (e.g., without receiving a configuration from a base station) determine the beam management configuration for different measurement occasions and/or different transmit beams (e.g., by allocating some measurement occasions and/or some transmit beams to be associated with static beam sweeping schedules and other measurement occasions and/or other transmit beams to be associated with dynamic beam sweeping schedules).

The static beam sweeping schedule may indicate that the UE 120 is to perform a receive beam sweep of all receive beams associated with the UE 120 and measure the CSI-RS transmitted on the transmit beam of the CSI-RS using all receive beams associated with the UE. For example, the UE 120 may perform a beam sweep across all pseudo-omni receive beams associated with the UE 120. In some aspects, the UE 120 may perform the receive beam sweep according to a round robin technique (e.g., according to a round robin scheduling algorithm where the UE 120 assigns a measurement to be performed using each receive beam in a cyclical manner, where each receive beam is assigned a fixed and/or equal time slot to perform the measurement). For example, under the static beam sweeping schedule each receive beam of the UE 120 may have a same priority. That is, the UE 120 may measure the CSI-RS on the transmit beam without any preferences for certain receive beams or transmit beams. In this way, the UE 120 may ensure spatial fairness among beams by measuring across all receive beams of the UE 120. As a result, the UE 120 may be enabled to detect a previously unknown beam, and/or detect a change in conditions of a beam, among other examples.

The dynamic beam sweeping schedule may indicate that the UE 120 is to perform a receive beam sweep of prioritized receive beams associated with the UE 120 and measure the CSI-RS transmitted on the transmit beam of the CSI-RS using the prioritized receive beams. The prioritized receive beams may be receive beams associated with high measurement values (e.g., RSRP values and/or signal-to-noise ratio (SNR) values). For example, the UE 120 may measure a CSI-RS on a transmit beam from the base station 110 using a receive beam (e.g., as part of a static beam sweeping schedule). The UE 120 may determine that the measurement value of the CSI-RS using the receive beam satisfies a threshold (e.g., a threshold RSRP, a threshold SNR, and/or the like). As a result, the UE 120 may determine that the receive beam should be prioritized for future measurements when the measurements are performed according to a dynamic beam sweeping schedule.

Additionally, or alternatively, the UE 120 may determine that a receive beam should be prioritized based at least in part on a spatial relationship of the receive beam. For example, a receive beam that is spatially located proximate to a prioritized receive beam may be prioritized (e.g., as receive beams located proximate to prioritized receive beams may have a higher likelihood of producing high measurement values when measuring the CSI-RS on the transmit beam).

As shown by reference number 630, the UE 120 may perform the receive beam sweep for a transmit beam (e.g., a CSI-RS transmit beam) according to the static beam sweeping schedule. For example, for a transmit beam of the CSI-RS, the UE 120 may determine that a transmit beam is associated with the static beam sweeping schedule based at least in part on the configuration (e.g., the beam management configuration). The UE 120 may perform a beam sweep across all receive beams associated with the UE 120 for the transmit beam.

As shown by reference number 640, the UE 120 may measure the CSI-RS transmitted on the transmit beam using one or more (or all) receive beams associated with the UE 120. For example, the UE 120 may perform a beam sweep across all receive beams associated with the UE 120 for the transmit beam. As a result, the UE 120 may measure the CSI-RS transmitted on the transmit beam using all receive beams associated with the UE 120. The UE 120 may report the measurements to the base station 110 according to a measuring and/or reporting configuration associated with the beam management procedure. For example, the UE 120 may transmit, and the base station 110 may receive, a measurement report indicating one or more measurements performed by the UE 120 (e.g., one or more measurements of the CSI-RS performed using one or more receive beams). The base station 110 may identify one or more candidate beam pair(s) based at least in part on the reported measurements. The UE 120 may perform a receive beam sweep, measurements, and/or reporting of measurements for the CSI-RS transmitted on a different transmit beam (e.g., that is determined by the UE 120 to be associated with the static beam sweeping schedule) in a similar manner.

As shown in FIG. 6B, and by reference number 650, the UE 120 may determine one or more receive beams to prioritize for dynamic beam scheduling. The UE 120 may determine a receive beam to prioritize based at least in part on a previous measurement performed using the receive beam, and/or based at least in part on a spatial relationship of the receive beam with one or more other prioritized receive beams, among other examples. The previous measurement may have been performed in connection with a static beam sweeping schedule and/or a dynamic beam sweeping schedule. For example, the UE 120 may measure a CSI-RS transmitted on a transmit beam using a receive beam. The UE 120 may determine that the measurement value of the measurement satisfies a threshold. The UE 120 may determine that the receive beam should be prioritized for future measurements and/or future receive beam sweeps.

In some aspects, the UE 120 may determine that a measurement value of the measurement does not satisfy the threshold. The UE 120 may determine that the receive beam should be deprioritized and/or not prioritized. In some aspects, the UE 120 may determine that a measurement value of a measurement performed using a previously prioritized receive beam no longer satisfies the threshold. The UE 120 may determine that the receive beam should be deprioritized and/or not prioritized.

In some aspects, the UE 120 may determine one or more receive beams to prioritize on a per transmit beam basis (e.g., a first set of receive beams may be prioritized for a first transmit beam and a second set of receive beams may be prioritized for a second transmit beam). In some aspects, the UE 120 may determine one or more receive beams to prioritize for one or more (or all) transmit beams.

As shown by reference number 660, the UE 120 may perform a receive beam sweep for a CSI-RS transmitted on a transmit beam (e.g., the shaded beam of the base station 110, as shown in FIG. 6B) using prioritized receive beams (e.g., the shaded beams of the UE 120, as shown in FIG. 6B) according to the dynamic beam sweeping schedule. The dynamic beam sweeping schedule may indicate that the UE 120 is to sweep through the prioritized receive beams while skipping the non-prioritized (or deprioritized) receive beams.

As shown by reference number 670, the UE 120 may measure the CSI-RS transmitted on the transmit beam using one or more prioritized receive beams. For example, the UE 120 may perform the receive beam sweep according to the dynamic beam sweeping schedule and may measure the CSI-RS transmitted on the transmit beam using the one or more prioritized receive beams. Similarly, the UE 120 may refrain from measuring the CSI-RS transmitted on the transmit beam using one or more non-prioritized receive beams. The UE 120 may report the measurements to the base station 110 according to a measuring and/or reporting configuration associated with the beam management procedure. For example, the UE 120 may transmit, and the base station 110 may receive, a measurement report indicating one or more measurements performed by the UE 120 (e.g., one or more measurements of the CSI-RS performed using one or more receive beams).

In this way, the UE 120 may measure and/or report measurements of receive beams associated with high historical measurement values more often. For example, the UE 120 may ensure spatial fairness by configuring some transmit beams with a static beam sweeping schedule (e.g., ensuring that the UE 120 measures using all available receive beams), while also prioritizing receive beams with high historical measurement values by configuring some transmit beams with a dynamic beam sweeping schedule. As a result, the UE 120 may be enabled to detect and measure using new beams and may detect a change in condition of non-prioritized beams (e.g., using the static beam sweeping schedule), while receive beams with high historical measurement values and/or with located spatially near other beams with high historical measurement values (e.g., prioritized beams) may be reported and scheduled more often (e.g., using the dynamic beam sweeping schedule). This results in a more efficient beam management procedure. Moreover, this may reduce latency associated with identifying and selecting beam pair(s), as the UE 120 may measure the CSI-RS on a transmit beam using prioritized receive beams more often, enabling the base station 110 to select a best beam pair quicker.

As indicated above, FIGS. 6A and 6B are provided as examples. Other examples may differ from what is described with respect to FIGS. 6A and 6B.

Figure 7:
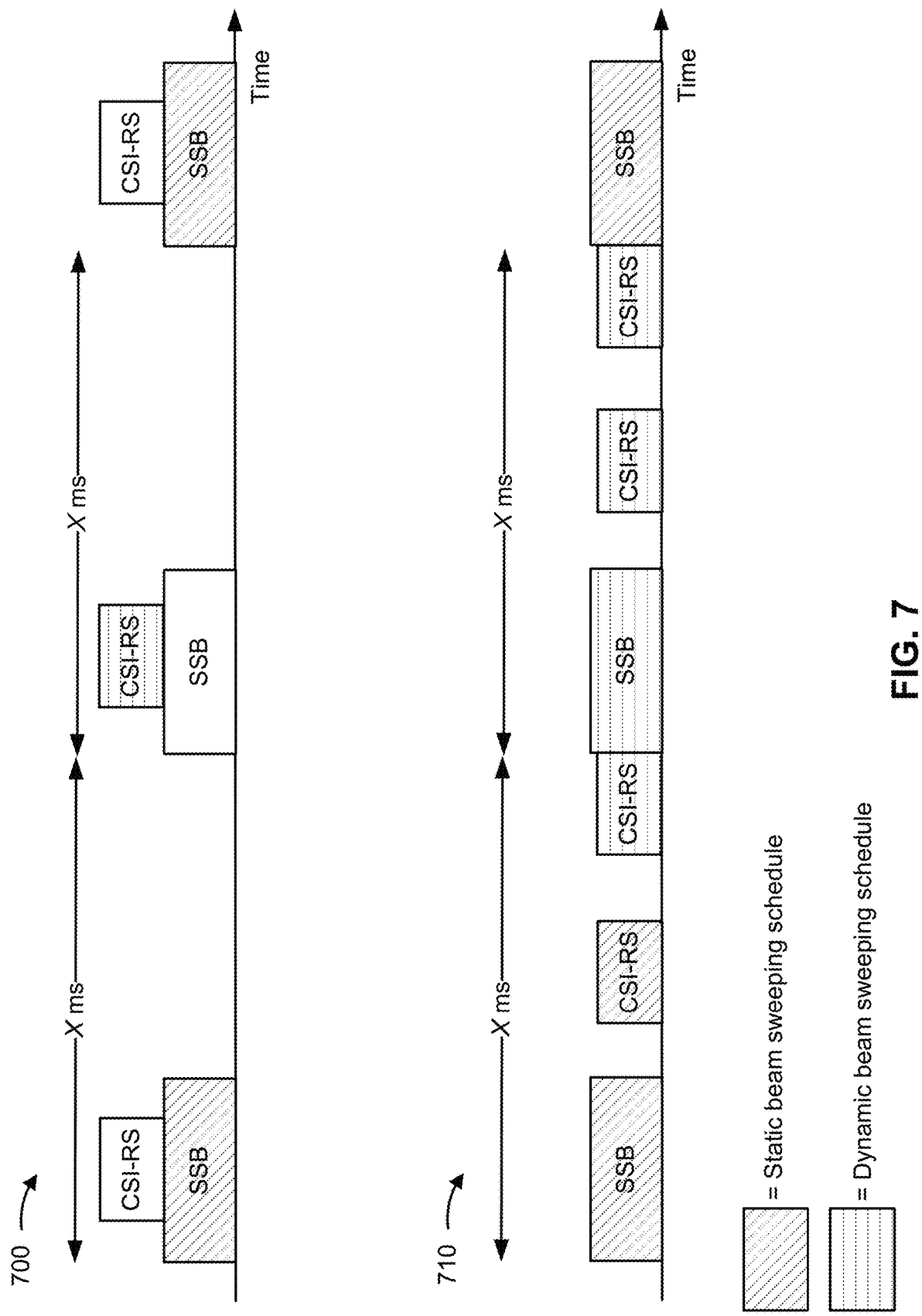
FIG. 7 is a diagram illustrating an example associated with periodic CSI-RS beam management scheduling, in accordance with the present disclosure.

FIG. 7 is a diagram illustrating one or more examples 700 and 710 associated with periodic CSI-RS beam management scheduling, in accordance with the present disclosure. As shown in FIG. 7, periodic CSI-RSs used for beam management may be transmitted along with SSBs. As described above, an SSB may be used for beam management in a similar manner as a CSI-RS (e.g., for the first beam management procedure described above in connection with example 500 of FIG. 5).

As shown in FIG. 7 and example 700, the periodic CSI-RSs may be frequency-division multiplexed (FDM) with the SSBs. In some aspects, as shown in example 700, a periodicity of the periodic CSI-RSs may be the same as (e.g., equal to) a periodicity of the SSBs (e.g., X ms, as shown in FIG. 7). In some aspects, the periodicity of the periodic CSI-RSs may be a multiple of the periodicity of the SSBs (e.g., 0.5X ms, 0.25X ms, 2X ms, 4X ms, and/or the like). As a result, in some aspects, some SSBs may be sent without a CSI-RS (e.g., some SSBs may be transmitted without being FDM with a CSI-RS and/or some CSI-RSs may be transmitted without being FDM with an SSB). In that case, the UE 120 may measure and report the measurements of the SSB (e.g., that are not FDM with a CSI-RS) according to a measurement configuration and/or a reporting configuration associated with the SSB. Similarly, the UE 120 may measure and report the measurements of the CSI-RS (e.g., that are not FDM with an SSB) according to a measurement configuration and/or a reporting configuration associated with the CSI-RS, such as described above with respect to FIGS. 6A and 6B. In some aspects, a UE 120 may determine that the periodic CSI-RS and the SSB are quasi co-located (QCL) based at least in part on determining that the CSI-RS and the SSB are FDM.

Example 700 may include CSI-RSs that are associated with static receive beam sweeping schedule or dynamic receive beam sweeping schedule (e.g., as described above in connection with FIGS. 6A and 6B). In some aspects, where a CSI-RS transmit beam is associated with the static receive beam sweeping schedule, the UE 120 may rely on SSB-based beam sweep scheduling to determine which receive beams are to be used to measure the SSB and/or the CSI-RS. For example, the SSB (e.g., that is FDM and QCL with the CSI-RS associated with the static receive beam sweeping schedule) may be transmitted on a transmit beam of the SSB. The UE 120 may perform a receive beam sweep according to a beam sweeping schedule associated with the SSB (e.g., with the transmit beam of the SSB and/or the like). The UE 120 may determine one or more measurements of the SSB transmitted using the transmit beam of the SSB using one or more receive beams (e.g., based at least in part on performing the receive beam sweep according to the beam sweeping schedule associated with the SSB). The UE 120 may determine one or more measurements of the CSI-RS for the one or more receive beams based at least in part on determining that the SSB and the CSI-RS are FDM and QCL (e.g., measurements of the CSI-RS using a receive beam may be inferred based at least in part on the measurements of the SSB using the same receive beam based at least in part on the QCL relationship between the CSI-RS and the SSB).

In some aspects, where a CSI-RS transmit beam is associated with the dynamic receive beam sweeping schedule, the UE 120 may rely on the CSI-RS-based beam sweep scheduling to determine which receive beams are to be used to measure the CSI-RS transmitted on the transmit beam. For example, as described above in connection with FIGS. 6A and 6B, the UE 120 may determine one or more receive beams to prioritize. In some aspects, a receive beam may be prioritized based at least in part on a measurement of an SSB (e.g., where the transmit beam of the SSB and the transmit beam of the CSI-RS are QCL). For example, the UE 120 may determine that a receive beam should be prioritized for a CSI-RS transmit beam based at least in part on determining that the receive beam should be prioritized for the transmit beam of the SSB. The UE 120 may perform receive beam sweeping according to the dynamic beam sweeping schedule for a CSI-RS (e.g., that is FDM and QCL with an SSB) in a similar manner as described above in connection with FIGS. 6A and 6B. For example, the UE 120 may measure the CSI-RS transmitted on the transmit beam of the CSI-RS using one or more prioritized receive beams and may refrain from measuring the CSI-RS transmitted on the transmit beam of the CSI-RS using one or more non-prioritized receive beams.

As shown in FIG. 7 and example 710, the periodic CSI-RSs may be time-division multiplexed (TDM) with the SSBs. In some aspects, a CSI-RS that is TDM with an SSB may be QCL with the SSB. Example 710 may include CSI-RSs that are associated with static receive beam sweeping schedule or dynamic receive beam sweeping schedule (e.g., as described above in connection with FIGS. 6A and 6B).

In some aspects, where a CSI-RS transmit beam is associated with the static receive beam sweeping schedule, the UE 120 may rely on SSB-based beam sweep scheduling to determine which receive beams are to be used to measure the SSB and/or the CSI-RS. For example, the SSB (e.g., that is TDM and QCL with the CSI-RS associated with the static receive beam sweeping schedule) may be transmitted on a transmit beam of the SSB. The UE 120 may perform a receive beam sweep according to a beam sweeping schedule associated with the SSB (e.g., with the transmit beam of the SSB and/or the like). The UE 120 may determine one or more measurements of the SSB transmitted using the transmit beam of the SSB using one or more receive beams (e.g., based at least in part on performing the receive beam sweep according to the beam sweeping schedule associated with the SSB). The UE 120 may determine one or more measurements of the CSI-RS for the one or more receive beams based at least in part on determining that the SSB and the CSI-RS are QCL (e.g., measurements of the CSI-RS using a receive beam may be inferred based at least in part on the measurements of the SSB using the same receive beam based at least in part on the QCL relationship between the CSI-RS and the SSB).

In some aspects, where a CSI-RS transmit beam is associated with the dynamic beam sweeping schedule, the UE 120 may determine which receive beams are to be used to measure the SSB and/or the CSI-RS based at least in part determining whether to prioritize a receive beam (e.g., based at least in part on measurements of the SSB performed using the receive beam and/or measurements of the CSI-RS performed using the receive beam). For example, a transmit beam of the SSB and a transmit beam of the CSI-RS may be included in a same quasi co-location group (e.g., may be QCL). If the UE 120 determines a receive beam is to be prioritized for the transmit beam of the SSB, the UE 120 may determine that the same receive beam is to be prioritized for the transmit beam of the CSI-RS (e.g., the SSB and CSI-RS transmit beams located in one quasi co-location group share an identical priority).

The UE 120 may measure the SSB transmitted on a transmit beam of the SSB using a receive beam and determine a prioritization (e.g., prioritized, deprioritized, not prioritized, and/or the like) associated with the receive beam based at least in part on measuring the SSB transmitted on the transmit beam of the SSB using the receive beam. The UE 120 may determine that the receive beam has a same prioritization (e.g., as a receive beam associated with a transmit beam of the CSI-RS) for the transmit beam of the CSI-RS based at least in part on a determination that the transmit beam of the SSB and the transmit beam of the CSI-RS are quasi co-located. Similarly, the UE 120 may determine a prioritization associated with a receive beam based at least in part on a measurement of the CSI-RS and may apply the same prioritization for the receive beam with the SSB. The UE 120 may perform dynamic beam sweeping for transmit beams of the CSI-RS (e.g., that is TDM and QCL with an SSB) that is associated with the dynamic beam sweeping schedule in a similar manner as described above in connection with FIGS. 6A and 6B. In some aspects, if a CSI-RS that is TDM with an SSB is QCL with the SSB, the UE 120 may measure the CSI-RS transmitted on the transmit beam of the CSI-RS according to the beam sweeping schedule associated with the transmit beam of the CSI-RS (e.g., in a similar manner as described below in connection with the scenario where the CSI-RS is not QCL with the SSB). In other words, the UE 120 may determine receive QCL information and may determine a manner in which to measure the CSI-RS based at least in part on the QCL information (e.g., the UE 120 may use the QCL information, as described above, or may not use the QCL information, as described below).

In some aspects, a CSI-RS that is TDM with an SSB (e.g., as shown in example 710) may not be QCL with the SSB. In that case, the UE 120 may measure the CSI-RS transmitted on the transmit beam of the CSI-RS using one or more receive beams according to the beam sweeping schedule associated with the transmit beam of the CSI-RS based at least in part on determining that the CSI-RS and the SSB are not QCL. For example, if the beam sweeping schedule associated with the transmit beam of the CSI-RS is the static beam sweeping schedule, the UE 120 may measure the CSI-RS transmitted on the transmit beam using all receive beams of the UE 120 (e.g., in a similar manner as described above in connection with FIGS. 6A and 6B). If the beam sweeping schedule associated with the transmit beam of the CSI-RS is the dynamic beam sweeping schedule, the UE 120 may measure the CSI-RS transmitted on the transmit beam using only prioritized receive beams (e.g., in a similar manner as described above in connection with FIGS. 6A and 6B).

In this way, the UE 120 may be enabled to harmonize the beam management procedure between the periodic CSI-RSs and SSBs that may be transmitted by the base station 110 for beam management purposes. As a result, the UE 120 may be enabled to use the SSBs and/or the periodic CSI-RSs for beam management (e.g., the first beam management procedure described above in connection with example 500 of FIG. 5 and/or the like) while maintaining the static beam sweeping schedule and/or the dynamic beam sweeping schedule described herein. This results in a more efficient beam management procedure. Furthermore, the UE 120 may be enabled to use measurements of SSBs to identify receive beams that should be prioritized, thereby reducing latency associated with identifying the prioritized receive beams. Moreover, this may reduce latency associated with identifying and selecting beam pair(s), as the UE 120 may measure the CSI-RS on a transmit beam using prioritized receive beams more often, enabling the base station 110 to select a best beam pair quicker.

As indicated above, FIG. 7 is provided as an example. Other examples may differ from what is described with respect to FIG. 7.

Figure 8:
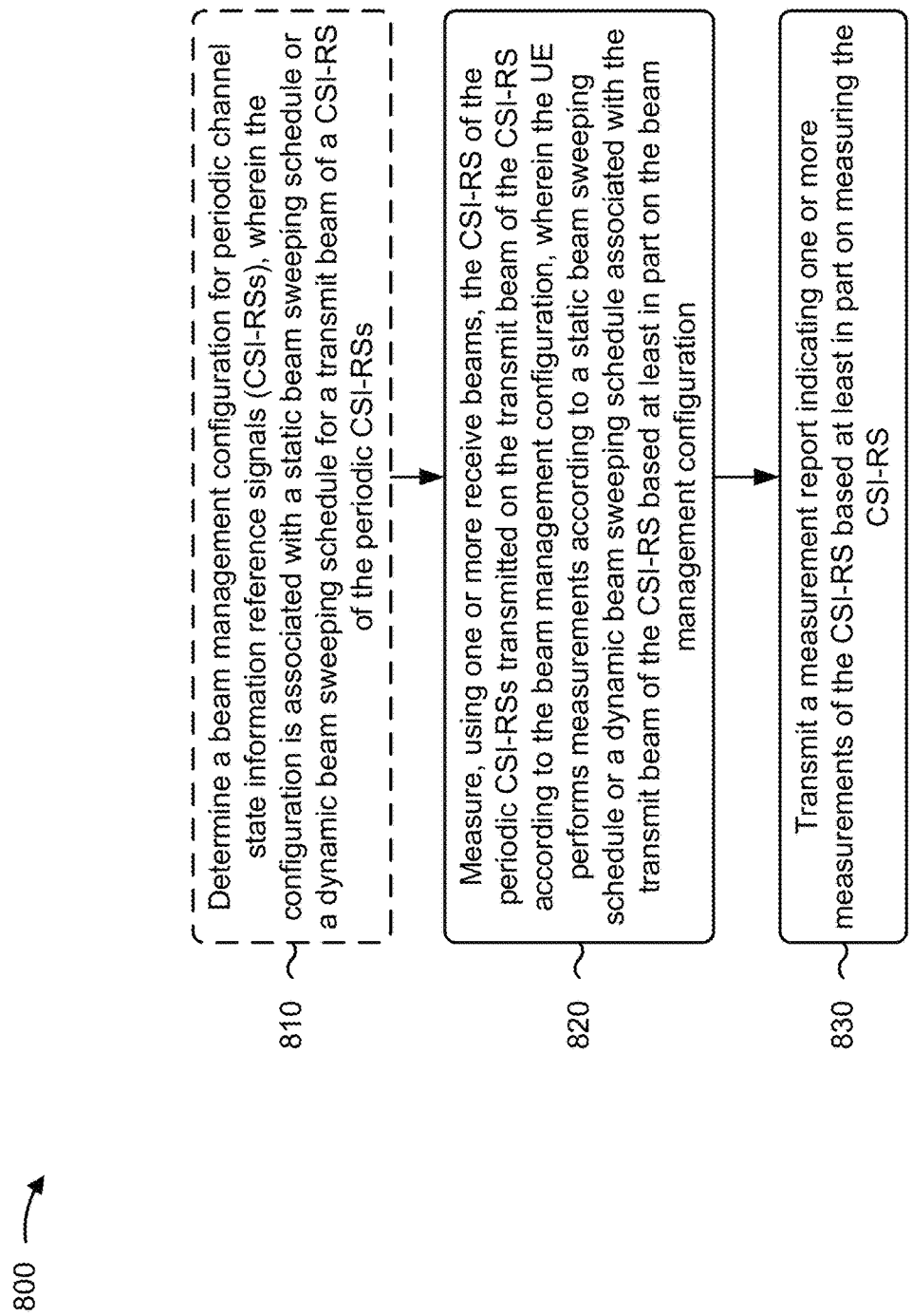
FIG. 8 is a diagram illustrating an example process associated with periodic CSI-RS beam management scheduling, in accordance with the present disclosure.

FIG. 8 is a diagram illustrating an example process 800 performed, for example, by a UE, in accordance with the present disclosure. Example process 800 is an example where the UE (e.g., UE 120) performs operations associated with periodic CSI-RS beam management scheduling.

As shown in FIG. 8, in some aspects, process 800 may optionally include determining a beam management configuration for periodic CSI-RSs, wherein the configuration is associated with a static beam sweeping schedule or a dynamic beam sweeping schedule for a transmit beam of a CSI-RS of the periodic CSI-RSs (block 810). For example, the UE (e.g., using receive processor 258, transmit processor 264, controller/processor 280, memory 282, and/or the like) may determine a beam management configuration for periodic CSI-RSs, as described above, for example, with reference to FIGS. 6A, 6B, and/or 7. In some aspects, the configuration may be associated with a static beam sweeping schedule or a dynamic beam sweeping schedule for a transmit beam of a CSI-RS of the periodic CSI-RSs.

As further shown in FIG. 8, in some aspects, process 800 may include measuring, using one or more receive beams, the CSI-RS transmitted on the transmit beam of the CSI-RS according to a beam management configuration for periodic CSI-RSs, wherein the UE performs measurements according to a static beam sweeping schedule or a dynamic beam sweeping schedule associated with the transmit beam of the CSI-RS based at least in part on the beam management configuration (block 820). For example, the UE (e.g., using receive processor 258, transmit processor 264, controller/processor 280, memory 282, and/or the like) may measure, using one or more receive beams, the CSI-RS transmitted on the transmit beam of the CSI-RS according to the beam management configuration for periodic CSI-RSs, wherein the UE performs measurements according to a static beam sweeping schedule or a dynamic beam sweeping schedule associated with the transmit beam of the CSI-RS based at least in part on the beam management configuration, as described above, for example, with reference to FIGS. 6A, 6B, and/or 7.

As further shown in FIG. 8, in some aspects, process 800 may include transmitting a measurement report indicating one or more measurements of the CSI-RS based at least in part on measuring the CSI-RS (block 830). For example, the UE (e.g., using controller/processor 280, transmit processor 264, TX MIMO processor 266, MOD 254, antenna 252, and/or memory 282) may transmit a measurement report indicating one or more measurements of the CSI-RS based at least in part on measuring the CSI-RS, as described above, for example, with reference to FIGS. 6A, 6B, and/or 7.

Process 800 may include additional aspects, such as any single aspect or any combination of aspects described below and/or in connection with one or more other processes described elsewhere herein.

In a first aspect, the CSI-RS is transmitted, by a base station, using one or more transmit beams according to a beam sweeping schedule associated with the base station.

In a second aspect, alone or in combination with the first aspect, the UE performs measurement according to the static beam sweeping schedule associated with the transmit beam of the CSI-RS based at least in part on the beam management configuration, and measuring the CSI-RS comprises performing a receive beam sweep of all receive beams associated with the UE, and measuring the CSI-RS using all receive beams associated with the UE based at least in part on performing the receive beam sweep.

In a third aspect, alone or in combination with one or more of the first and second aspects, performing the receive beam sweep comprises performing the receive beam sweep according to a round robin technique.

In a fourth aspect, alone or in combination with one or more of the first through third aspects, process 800 includes determining a prioritization of one or more receive beams based at least in part on measuring the CSI-RS.

In a fifth aspect, alone or in combination with one or more of the first through fourth aspects, determining the prioritization of a receive beam of the one or more receive beams is based at least in part on at least one of a measurement value of the CSI-RS, or a spatial relationship of the receive beam with one or more other prioritized receive beams.

In a sixth aspect, alone or in combination with one or more of the first through fifth aspects, determining the prioritization of the receive beam of the one or more receive beams comprises determining whether the measurement value of the CSI-RS satisfies a threshold, and determining the prioritization of the receive beam based at least in part on determining whether the measurement value of the CSI-RS satisfies the threshold.

In a seventh aspect, alone or in combination with one or more of the first through sixth aspects, the measurement value is at least one of an RSRP value, or an SNR value.

In an eighth aspect, alone or in combination with one or more of the first through seventh aspects, the UE performs measurement according to the dynamic beam sweeping schedule associated with the transmit beam of the CSI-RS based at least in part on the beam management configuration, and measuring the CSI-RS using the one or more receive beams comprises measuring the CSI-RS based at least in part on a determination of one or more receive beams to prioritize, and refraining from measuring the CSI-RS using one or more non-prioritized receive beams based at least in part on the determination of the one or more receive beams to prioritize.

In a ninth aspect, alone or in combination with one or more of the first through eighth aspects, the CSI-RS is frequency-division multiplexed with an SSB, and a periodicity of the periodic CSI-RSs is a same periodicity as a periodicity associated with the SSB or a multiple of the periodicity associated with the SSB.

In a tenth aspect, alone or in combination with one or more of the first through ninth aspects, process 800 includes determining that the transmit beam of the CSI-RS and a transmit beam of the SSB are quasi co-located based at least in part on the CSI-RS being frequency-division multiplexed with the SSB.

In an eleventh aspect, alone or in combination with one or more of the first through tenth aspects, the UE performs measurement according to the static beam sweeping schedule associated with the transmit beam of the CSI-RS based at least in part on the beam management configuration, and measuring the CSI-RS comprises measuring, using the one or more receive beams, the SSB transmitted on a transmit beam of the SSB according to a beam sweeping schedule associated with the SSB, and determining a measurement of the CSI-RS for the one or more receive beams based at least in part on measuring the SSB.

In a twelfth aspect, alone or in combination with one or more of the first through eleventh aspects, the UE performs measurement according to the dynamic beam sweeping schedule associated with the transmit beam of the CSI-RS based at least in part on the beam management configuration, and measuring the CSI-RS using the one or more receive beams comprises measuring the CSI-RS using one or more prioritized receive beams based at least in part on a determination of one or more receive beams to prioritize, and refraining from measuring the CSI-RS using one or more non-prioritized receive beams based at least in part on the determination of the one or more receive beams to prioritize.

In a thirteenth aspect, alone or in combination with one or more of the first through twelfth aspects, the CSI-RS is time-division multiplexed with an SSB.

In a fourteenth aspect, alone or in combination with one or more of the first through thirteenth aspects, process 800 includes determining that the CSI-RS and the SSB are quasi co-located.

In a fifteenth aspect, alone or in combination with one or more of the first through fourteenth aspects, the UE performs measurement according to the static beam sweeping schedule associated with the transmit beam of the CSI-RS based at least in part on the beam management configuration, and measuring the CSI-RS comprises measuring the SSB according to a beam sweeping schedule associated with the SSB, and determining a measurement of the CSI-RS based at least in part on a quasi co-location relationship between the transmit beam of the CSI-RS and the transmit beam of the SSB.

In a sixteenth aspect, alone or in combination with one or more of the first through fifteenth aspects, the UE performs measurement according to the dynamic beam sweeping schedule associated with the transmit beam of the CSI-RS based at least in part on the beam management configuration, and measuring the CSI-RS using the one or more receive beams comprises measuring the CSI-RS using one or more prioritized receive beams based at least in part on a determination of one or more receive beams to prioritize, and refraining from measuring the CSI-RS using one or more non-prioritized receive beams based at least in part on the determination of the one or more receive beams to deprioritize.

In a seventeenth aspect, alone or in combination with one or more of the first through sixteenth aspects, process 800 includes determining that the transmit beam of the CSI-RS and a transmit beam of the SSB are included in a same quasi co-location group; determining a prioritization associated with a receive beam of the one or more receive beams based at least in part on a measurement of the CSI-RS or based at least in part on a measurement of the SSB; and determining that the receive beam has a same prioritization for both the transmit beam of the CSI-RS and the transmit beam of the SSB based at least in part on determining that the transmit beam of the CSI-RS and the transmit beam of the SSB are included in the same quasi co-location group.

In an eighteenth aspect, alone or in combination with one or more of the first through seventeenth aspects, the UE performs measurement according to the dynamic beam sweeping schedule associated with the transmit beam of the CSI-RS based at least in part on the beam management configuration, and measuring the CSI-RS includes measuring, using a receive beam, the SSB transmitted on a transmit beam of the SSB; determining a prioritization associated with the receive beam based at least in part on measuring the SSB, and determining that the receive beam has a same prioritization for the transmit beam of the CSI-RS based at least in part on a determination that the transmit beam of the SSB and the transmit beam of the CSI-RS are quasi co-located.

In a nineteenth aspect, alone or in combination with one or more of the first through eighteenth aspects, process 800 includes determining that the CSI-RS and the SSB are not quasi co-located.

In a twentieth aspect, alone or in combination with one or more of the first through nineteenth aspects, measuring the CI-RS includes measuring the CSI-RS according to a beam sweeping schedule associated with the transmit beam of the CSI-RS, based at least in part on determining that the CSI-RS and the SSB are not quasi co-located.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The following provides an overview of some Aspects of the present disclosure:

Aspect 1: A method of wireless communication performed by a user equipment (UE), comprising: measuring, using one or more receive beams, a channel state information reference signal (CSI-RS) transmitted on a transmit beam of the CSI-RS according to a beam management configuration for periodic CSI-RSs, wherein the UE performs measurements according to a static beam sweeping schedule or a dynamic beam sweeping schedule associated with the transmit beam of the CSI-RS based at least in part on the beam management configuration; and transmitting a measurement report indicating one or more measurements of the CSI-RS based at least in part on measuring the CSI-RS.

Aspect 2: The method of Aspect 1, wherein the CSI-RS is transmitted, by a base station, using one or more transmit beams according to a beam sweeping schedule associated with the base station.

Aspect 3: The method of any of Aspects 1-2, wherein the UE performs measurement according to the static beam sweeping schedule associated with the transmit beam of the CSI-RS based at least in part on the beam management configuration, and wherein measuring the CSI-RS comprises: performing a receive beam sweep of all receive beams associated with the UE; and measuring the CSI-RS using all receive beams associated with the UE based at least in part on performing the receive beam sweep.

Aspect 4: The method of Aspect 3, wherein performing the receive beam sweep comprises performing the receive beam sweep according to a round robin technique.

Aspect 5: The method of any of Aspects Aspect 1-4, further comprising: determining a prioritization of one or more receive beams based at least in part on measuring the CSI-RS transmitted on the transmit beam of the CSI-RS using the one or more receive beams.

Aspect 6: The method of Aspect 5, wherein determining the prioritization of a receive beam of the one or more receive beams is based at least in part on at least one of: a measurement value of the CSI-RS using the receive beam, or a spatial relationship of the receive beam with one or more other prioritized receive beams.

Aspect 7: The method of Aspect 6, wherein determining the prioritization of the receive beam of the one or more receive beams comprises: determining whether the measurement value of the CSI-RS measured using the receive beam satisfies a threshold; and determining the prioritization of the receive beam based at least in part on determining whether the measurement value of the CSI-RS satisfies the threshold.

Aspect 8: The method of any of Aspects 6-7, wherein the measurement value is at least one of: a reference signal received power (RSRP) value, or a signal-to-noise ratio (SNR) value.

Aspect 9: The method of any of Aspects 1-2 and 4-8, wherein the UE performs measurement according to the dynamic beam sweeping schedule associated with the transmit beam of the CSI-RS based at least in part on the beam management configuration, and wherein measuring the CSI-RS using the one or more receive beams comprises: measuring the CSI-RS using one or more prioritized receive beams based at least in part on a determination of one or more receive beams to prioritize; and refraining from measuring the CSI-RS using one or more non-prioritized receive beams based at least in part on the determination of the one or more receive beams to prioritize.

Aspect 10: The method of any of Aspects 1-9, wherein the CSI-RS is frequency-division multiplexed with a synchronization signal block (SSB), and wherein a periodicity of the periodic CSI-RSs is a same periodicity as a periodicity associated with the SSB or a multiple of the periodicity associated with the SSB.

Aspect 11: The method of Aspect 10, further comprising: determining that the transmit beam of the CSI-RS and a transmit beam of the SSB are quasi co-located based at least in part on the CSI-RS being frequency-division multiplexed with the SSB.

Aspect 12: The method of any of Aspects 10-11, wherein the UE performs measurement according to the static beam sweeping schedule associated with the transmit beam of the CSI-RS based at least in part on the beam management configuration, and wherein measuring the CSI-RS comprises: measuring, using the one or more receive beams, the SSB transmitted on the transmit beam of the SSB according to a beam sweeping schedule associated with the SSB; and determining a measurement of the CSI-RS for the one or more receive beams based at least in part on measuring the SSB transmitted on the transmit beam of the SSB using the one or more receive beams.

Aspect 13: The method of any of Aspects 10-11, wherein the UE performs measurement according to the dynamic beam sweeping schedule associated with the transmit beam of the CSI-RS based at least in part on the beam management configuration, and wherein measuring the CSI-RS using the one or more receive beams comprises: measuring the CSI-RS using one or more prioritized receive beams based at least in part on a determination of one or more receive beams to prioritize; and refraining from measuring the CSI-RS using one or more non-prioritized receive beams based at least in part on the determination of the one or more receive beams to prioritize.

Aspect 14: The method of any of Aspects 1-13, wherein the CSI-RS is time-division multiplexed with a synchronization signal block (SSB).

Aspect 15: The method of Aspect 14, further comprising: determining that the CSI-RS and the SSB are quasi co-located.

Aspect 16: The method of Aspect 15, wherein the UE performs measurement according to the static beam sweeping schedule associated with the transmit beam of the CSI-RS based at least in part on the beam management configuration, and wherein measuring the CSI-RS comprises: measuring, using the one or more receive beams, the SSB transmitted on a transmit beam of the SSB according to a beam sweeping schedule associated with the SSB; and determining a measurement of the CSI-RS for the one or more receive beams based at least in part on a quasi co-location relationship between the transmit beam of the CSI-RS and the transmit beam of the SSB.

Aspect 17: The method of Aspect 15, wherein the UE performs measurement according to the dynamic beam sweeping schedule associated with the transmit beam of the CSI-RS based at least in part on the beam management configuration, and wherein measuring the CSI-RS using the one or more receive beams comprises: measuring the CSI-RS using one or more prioritized receive beams based at least in part on a determination of one or more receive beams to prioritize; and refraining from measuring the CSI-RS using one or more non-prioritized receive beams based at least in part on the determination of the one or more receive beams to deprioritize.

Aspect 18: The method of Aspect 17, further comprising: determining that the transmit beam of the CSI-RS and a transmit beam of the SSB are included in a same quasi co-location group; determining a prioritization associated with a receive beam of the one or more receive beams based at least in part on a measurement of the CSI-RS or based at least in part on a measurement of the SSB; and determining that the receive beam has a same prioritization for both the transmit beam of the CSI-RS and the transmit beam of the SSB based at least in part on determining that the transmit beam of the CSI-RS and the transmit beam of the SSB are included in the same quasi co-location group.

Aspect 19: The method of any of Aspects 15 and 17-18, wherein the UE performs measurement according to the dynamic beam sweeping schedule associated with the transmit beam of the CSI-RS based at least in part on the beam management configuration, the method further comprising: measuring, using a receive beam, the SSB transmitted on a transmit beam of the SSB; determining a prioritization associated with the receive beam based at least in part on measuring the SSB transmitted on the transmit beam of the SSB using the receive beam; and determining that the receive beam has a same prioritization for the transmit beam of the CSI-RS based at least in part on a determination that the transmit beam of the SSB and the transmit beam of the CSI-RS are quasi co-located.

Aspect 20: The method of Aspect 14, further comprising: determining that the CSI-RS and the SSB are not quasi co-located.

Aspect 21: The method of Aspect 20, further comprising: measuring the CSI-RS according to a beam sweeping schedule associated with the transmit beam of the CSI-RS based at least in part on determining that the CSI-RS and the SSB are not quasi co-located.

Aspect 22: The method of any of Aspects 1-8, 10-12, 14-16, and 20-21, wherein the CSI-RS is time-division multiplexed with a synchronization signal block (SSB), wherein the CSI-RS and the SSB are quasi co-located, and wherein the UE performs measurement according to the static beam sweeping schedule associated with the transmit beam of the CSI-RS based at least in part on the beam management configuration, and wherein measuring the CSI-RS comprises: measuring, using the one or more receive beams, the SSB transmitted on a transmit beam of the SSB according to a beam sweeping schedule associated with the SSB; and determining a measurement of the CSI-RS for the one or more receive beams based at least in part on a quasi co-location relationship between the transmit beam of the CSI-RS and the transmit beam of the SSB.

Aspect 23: The method of any of Aspects 1-2, 4-11, 13-15, and 17-21, wherein the CSI-RS is time-division multiplexed with a synchronization signal block (SSB), wherein the CSI-RS and the SSB are quasi co-located, and wherein the UE performs measurement according to the dynamic beam sweeping schedule associated with the transmit beam of the CSI-RS based at least in part on the beam management configuration, and wherein measuring the CSI-RS using the one or more receive beams comprises: measuring the CSI-RS using one or more prioritized receive beams based at least in part on a determination of one or more receive beams to prioritize; and refraining from measuring the CSI-RS using one or more non-prioritized receive beams based at least in part on the determination of the one or more receive beams to deprioritize.

Aspect 24: The method of any of Aspects 1-2, 4-11, 13-15, and 17-21, wherein the CSI-RS is time-division multiplexed with a synchronization signal block (SSB), wherein the CSI-RS and the SSB are quasi co-located, and wherein the UE performs measurement according to the dynamic beam sweeping schedule associated with the transmit beam of the CSI-RS based at least in part on the beam management configuration, the method further comprising: measuring, using a receive beam, the SSB transmitted on a transmit beam of the SSB; determining a prioritization associated with the receive beam based at least in part on measuring the SSB; and determining that the receive beam has a same prioritization for the transmit beam of the CSI-RS based at least in part on a determination that the transmit beam of the SSB and the transmit beam of the CSI-RS are quasi co-located.

Aspect 25: The method of any of Aspects 1-24, wherein the CSI-RS is time-division multiplexed with a synchronization signal block (SSB), wherein the CSI-RS and the SSB are not quasi co-located, and wherein measuring the CSI-RS: measuring the CSI-RS according to a beam sweeping schedule associated with the transmit beam of the CSI-RS based at least in part on determining that the CSI-RS and the SSB are not quasi co-located.

Aspect 26: An apparatus for wireless communication at a device, comprising a processor; memory coupled with the processor; and instructions stored in the memory and executable by the processor to cause the apparatus to perform the method of one or more of Aspects 1-25.

Aspect 27: A device for wireless communication, comprising a memory and one or more processors coupled to the memory, the one or more processors configured to perform the method of one or more of Aspects 1-25.

Aspect 28: An apparatus for wireless communication, comprising at least one means for performing the method of one or more of Aspects 1-25.

Aspect 29: A non-transitory computer-readable medium storing code for wireless communication, the code comprising instructions executable by a processor to perform the method of one or more of Aspects 1-25.

Aspect 30: A non-transitory computer-readable medium storing a set of instructions for wireless communication, the set of instructions comprising one or more instructions that, when executed by one or more processors of a device, cause the device to perform the method of one or more of Aspects 1-25.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
measuring, using one or more receive beams, a channel state information reference signal (CSI-RS), transmitted on a transmit beam of the CSI-RS, according to a beam management configuration, determined by the UE, for periodic CSI-RSs, wherein the UE performs measurements according to a static beam sweeping schedule or a dynamic beam sweeping schedule associated with the transmit beam of the CS-RS and indicated by the beam management configuration; and transmitting a measurement report indicating one or more measurements of the CSI-RS based at least in part on measuring the CSI-RS.

2. The method of claim 1, wherein the CSI-RS is transmitted, by a base station, using one or more transmit beams according to a beam sweeping schedule associated with the base station.

3. The method of claim 1, wherein the UE performs measurements according to the static beam sweeping schedule associated with the transmit beam of the CS-RS and indicated by the beam management configuration, and
wherein measuring the CSI-RS comprises:
performing a receive beam sweep of all receive beams associated with the UE; and
measuring the CSI-RS using all receive beams associated with the UE based at least in part on performing the receive beam sweep.

4. The method of claim 1, further comprising:
determining a prioritization of one or more receive beams based at least in part on measuring the CSI-RS.

5. The method of claim 4, wherein determining the prioritization of a receive beam of the one or more receive beams is based at least in part on at least one of:
a measurement value of the CSI-RS, or
a spatial relationship of the receive beam with one or more other prioritized receive beams.

6. The method of claim 1, wherein the UE performs measurements according to the dynamic beam sweeping schedule associated with the transmit beam of the CSI-RS and indicated by the beam management configuration, and
wherein measuring the CSI-RS using the one or more receive beams comprises:
measuring the CSI-RS using one or more prioritized receive beams based at least in part on a determination of one or more receive beams to prioritize; and
refraining from measuring the CSI-RS using one or more non-prioritized receive beams based at least in part on the determination of the one or more receive beams to prioritize.

7. The method of claim 1, wherein the CSI-RS is frequency-division multiplexed with a synchronization signal block (SSB), and wherein a periodicity of the periodic CSI-RSs is a same periodicity as a periodicity associated with the SSB or a multiple of the periodicity associated with the SSB.

8. The method of claim 7, wherein the UE performs measurements according to the static beam sweeping schedule associated with the transmit beam of the CS-RS and indicated by the beam management configuration, and
wherein measuring the CSI-RS comprises:
measuring, using the one or more receive beams, the SSB transmitted on a transmit beam of the SSB according to a beam sweeping schedule associated with the SSB; and
determining a measurement of the CSI-RS for the one or more receive beams based at least in part on measuring the SSB.

9. The method of claim 7, wherein the UE performs measurements according to the dynamic beam sweeping schedule associated with the transmit beam of the CSI-RS and indicated by the beam management configuration, and wherein measuring the CSI-RS using the one or more receive beams comprises:
measuring the CSI-RS using one or more prioritized receive beams based at least in part on a determination of one or more receive beams to prioritize; and
refraining from measuring the CSI-RS using one or more non-prioritized receive beams based at least in part on the determination of the one or more receive beams to prioritize.

10. The method of claim 1, wherein the CSI-RS is time-division multiplexed with a synchronization signal block (SSB), wherein the CSI-RS and the SSB are quasi co-located, and wherein the UE performs measurements according to the static beam sweeping schedule associated with the transmit beam of the CSI-RS and indicated by the beam management configuration, and
wherein measuring the CSI-RS comprises:
measuring, using the one or more receive beams, the SSB transmitted on a transmit beam of the SSB according to a beam sweeping schedule associated with the SSB; and
determining a measurement of the CSI-RS for the one or more receive beams based at least in part on a quasi co-location relationship between the transmit beam of the CSI-RS and the transmit beam of the SSB.

11. The method of claim 1, wherein the CSI-RS is time-division multiplexed with a synchronization signal block (SSB), wherein the CSI-RS and the SSB are quasi co-located, and wherein the UE performs measurements according to the dynamic beam sweeping schedule associated with the transmit beam of the CS-RS and indicated by the beam management configuration, and
wherein measuring the CSI-RS using the one or more receive beams comprises:
measuring the CSI-RS using one or more prioritized receive beams based at least in part on a determination of one or more receive beams to prioritize; and
refraining from measuring the CSI-RS using one or more non-prioritized receive beams based at least in part on the determination of the one or more receive beams to deprioritize.

12. The method of claim 11, further comprising:
determining that the transmit beam of the CSI-RS and a transmit beam of the SSB are included in a same quasi co-location group;
determining a prioritization associated with a receive beam of the one or more receive beams based at least in part on a measurement of the CSI-RS using the receive beam of the one or more receive beams or based at least in part on a measurement of the SSB transmitted on the transmit beam of the SSB using the receive beam of the one or more receive beams; and
determining that the receive beam has a same prioritization for both the transmit beam of the CSI-RS and the transmit beam of the SSB based at least in part on determining that the transmit beam of the CSI-RS and the transmit beam of the SSB are included in the same quasi co-location group.

13. The method of claim 1, wherein the CSI-RS is time-division multiplexed with a synchronization signal block (SSB), wherein the CSI-RS and the SSB are quasi co-located, and wherein the UE performs measurements according to the dynamic beam sweeping schedule associated with the transmit beam of the CS-RS and indicated by the beam management configuration, the method further comprising:
measuring, using a receive beam, the SSB transmitted on a transmit beam of the SSB;
determining a prioritization associated with the receive beam based at least in part on measuring the SSB; and
determining that the receive beam has a same prioritization for the transmit beam of the CSI-RS based at least in part on a determination that the transmit beam of the SSB and the transmit beam of the CSI-RS are quasi co-located.

14. The method of claim 1, wherein the CSI-RS is time-division multiplexed with a synchronization signal block (SSB), wherein the CSI-RS and the SSB are not quasi co-located, and wherein measuring the CSI-RS comprises:
measuring the CSI-RS according to a beam sweeping schedule associated with the transmit beam of the CSI-RS based at least in part on determining that the CSI-RS and the SSB are not quasi co-located.

15. A user equipment (UE) for wireless communication, comprising:
a memory; and
one or more processors, coupled to the memory, configured to:
measure, using one or more receive beams, a channel state information reference signal (CSI-RS), transmitted on a transmit beam of the CSI-RS, according to a beam management configuration, determined by the UE, for periodic CSI-RSs, wherein the UE performs measurements according to a static beam sweeping schedule or a dynamic beam sweeping schedule associated with the transmit beam of the CSI-RS and indicated by the beam management configuration; and
transmit a measurement report indicating one or more measurements of the CSI-RS based at least in part on measuring the CSI-RS.

16. The UE of claim 15, wherein the CSI-RS is transmitted, by a base station, using one or more transmit beams according to a beam sweeping schedule associated with the base station.

17. The UE of claim 15, wherein the UE performs measurements according to the static beam sweeping schedule associated with the transmit beam of the CS-RS and indicated by the beam management configuration, and
wherein the one or more processors, to measure the CSI-RS, are configured to:
perform a receive beam sweep of all receive beams associated with the UE; and
measure the CSI-RS using all receive beams associated with the UE based at least in part on performing the receive beam sweep.

18. The UE of claim 15, wherein the one or more processors are further configured to:
determine a prioritization of one or more receive beams based at least in part on measuring the CSI-RS.

19. The UE of claim 18, wherein determining the prioritization of a receive beam of the one or more receive beams is based at least in part on at least one of:
a measurement value of the CSI-RS, or
a spatial relationship of the receive beam with one or more other prioritized receive beams.

20. The UE of claim 15, wherein the UE performs measurements according to the dynamic beam sweeping schedule associated with the transmit beam of the CSI-RS and indicated by the beam management configuration, and wherein the one or more processors, to measure the CSI-RS using the one or more receive beams, are configured to:
measure the CSI-RS using one or more prioritized receive beams based at least in part on a determination of one or more receive beams to prioritize; and
refrain from measuring the CSI-RS using one or more non-prioritized receive beams based at least in part on the determination of the one or more receive beams to prioritize.

21. The UE of claim 15, wherein the CSI-RS is frequency-division multiplexed with a synchronization signal block (SSB), and wherein a periodicity of the periodic CSI-RSs is a same periodicity as a periodicity associated with the SSB or a multiple of the periodicity associated with the SSB.

22. The UE of claim 21, wherein the UE performs measurements according to the static beam sweeping schedule associated with the transmit beam of the CS-RS and indicated by the beam management configuration, and
wherein the one or more processors, to measure the CSI-RS, are configured to:
measure, using the one or more receive beams, the SSB transmitted on a transmit beam of the SSB according to a beam sweeping schedule associated with the SSB; and
determine a measurement of the CSI-RS for the one or more receive beams based at least in part on measuring the SSB.

23. The UE of claim 21, wherein the UE performs measurements according to the dynamic beam sweeping schedule associated with the transmit beam of the CSI-RS and indicated by the beam management configuration, and
wherein the one or more processors, to measure the CSI-RS using the one or more receive beams, are configured to:
measure the CSI-RS using one or more prioritized receive beams based at least in part on a determination of one or more receive beams to prioritize; and
refrain from measuring the CSI-RS using one or more non-prioritized receive beams based at least in part on the determination of the one or more receive beams to prioritize.

24. The UE of claim 15, wherein the CSI-RS is time-division multiplexed with a synchronization signal block (SSB), wherein the CSI-RS and the SSB are quasi co-located, and wherein the UE performs measurements according to the static beam sweeping schedule associated with the transmit beam of the CS-RS and indicated by the beam management configuration, and
wherein the one or more processors, to measure the CSI-RS, are configured to:
measure, using the one or more receive beams, the SSB transmitted on a transmit beam of the SSB according to a beam sweeping schedule associated with the SSB; and
determine a measurement of the CSI-RS for the one or more receive beams based at least in part on a quasi co-location relationship between the transmit beam of the CSI-RS and the transmit beam of the SSB.

25. The UE of claim 15, wherein the CSI-RS is time-division multiplexed with a synchronization signal block (SSB), wherein the CSI-RS and the SSB are quasi co-located, and wherein the UE performs measurements according to the dynamic beam sweeping schedule associated with the transmit beam of the CS-RS and indicated by the beam management configuration, and wherein the one or more processors, to measure the CSI-RS using the one or more receive beams, are configured to:
- measure the CSI-RS using one or more prioritized receive beams based at least in part on a determination of one or more receive beams to prioritize; and
- refrain from measuring the CSI-RS using one or more non-prioritized receive beams based at least in part on the determination of the one or more receive beams to deprioritize.

26. The UE of claim 25, wherein the one or more processors are further configured to:
- determine that the transmit beam of the CSI-RS and a transmit beam of the SSB are included in a same quasi co-location group;
- determine a prioritization associated with a receive beam of the one or more receive beams based at least in part on a measurement of the CSI-RS using the receive beam of the one or more receive beams or based at least in part on a measurement of the SSB transmitted on the transmit beam of the SSB using the receive beam of the one or more receive beams; and
- determine that the receive beam has a same prioritization for both the transmit beam of the CSI-RS and the transmit beam of the SSB based at least in part on determining that the transmit beam of the CSI-RS and the transmit beam of the SSB are included in the same quasi co-location group.

27. The UE of claim 15, wherein the CSI-RS is time-division multiplexed with a synchronization signal block (SSB), wherein the CSI-RS and the SSB are quasi co-located, wherein the UE performs measurements according to the dynamic beam sweeping schedule associated with the transmit beam of the CS-RS and indicated by the beam management configuration, and
wherein the one or more processors are further configured to:
- measure, using a receive beam, the SSB transmitted on a transmit beam of the SSB;
- determine a prioritization associated with the receive beam based at least in part on measuring the SSB; and
- determine that the receive beam has a same prioritization for the transmit beam of the CSI-RS based at least in part on a determination that the transmit beam of the SSB and the transmit beam of the CSI-RS are quasi co-located.

28. The UE of claim 15, wherein the CSI-RS is time-division multiplexed with a synchronization signal block (SSB), wherein the CSI-RS and the SSB are not quasi co-located, and
wherein the one or more processors, to measure the CSI-RS, are configured to:
- measure the CSI-RS according to a beam sweeping schedule associated with the transmit beam of the CSI-RS based at least in part on determining that the CSI-RS and the SSB are not quasi co-located.

29. A non-transitory computer-readable medium storing a set of instructions for wireless communication, the set of instructions comprising:
one or more instructions that, when executed by one or more processors of a user equipment (UE), cause the UE to:
- measure, using one or more receive beams, a channel state information reference signal (CSI-RS) transmitted on a transmit beam of the CSI-RS according to a beam management configuration, determined by the UE, for periodic CSI-RSs, wherein the UE performs measurements according to a static beam sweeping schedule or a dynamic beam sweeping schedule associated with the transmit beam of the CSI-RS and indicated by the beam management configuration; and
- transmit a measurement report indicating one or more measurements of the CSI-RS based at least in part on measuring the CSI-RS.

30. An apparatus for wireless communication, comprising:
- means for measuring, using one or more receive beams, a channel state information reference signal (CSI-RS) transmitted on a transmit beam of the CSI-RS according to a beam management configuration, determined by the apparatus, for periodic CSI-RSs, wherein the apparatus performs measurements according to a static beam sweeping schedule or a dynamic beam sweeping schedule associated with the transmit beam of the CS-RS and indicated by the beam management configuration; and
- means for transmitting a measurement report indicating one or more measurements of the CSI-RS based at least in part on measuring the CSI-RS.

* * * * *